United States Patent [19]

Watanabe

[11] Patent Number: 5,187,530
[45] Date of Patent: Feb. 16, 1993

[54] ORIGINAL SETTING DEVICE FOR IMAGE FORMING APPARATUS

[75] Inventor: Junji Watanabe, Yokohama, Japan

[73] Assignee: Kabushiki Kaisha Toshiba, Kawasaki, Japan

[21] Appl. No.: 411,105

[22] Filed: Sep. 22, 1989

[30] Foreign Application Priority Data

Sep. 26, 1988 [JP] Japan ............................. 63-240013
Sep. 26, 1988 [JP] Japan ............................. 63-240021
Sep. 30, 1988 [JP] Japan ............................. 63-245995

[51] Int. Cl.[5] ..................... G03G 21/00; G03G 15/00
[52] U.S. Cl. ............................ 355/308; 271/248; 271/301; 355/317; 355/321
[58] Field of Search ............... 355/75, 230, 308, 309, 355/317, 318, 321; 271/3, 248, 301

[56] References Cited

U.S. PATENT DOCUMENTS

| 3,556,512 | 1/1971 | Fackler | 271/4 |
| 3,998,541 | 12/1976 | Michaloski | 355/230 X |
| 4,422,751 | 12/1983 | Komiya et al. | 355/206 |
| 4,530,598 | 7/1985 | Kajita et al. | 355/75 |
| 4,610,533 | 9/1986 | Takahata | 355/309 |
| 4,657,376 | 4/1987 | Ide | 355/309 |
| 4,836,525 | 6/1989 | Mizuno | 355/309 X |
| 4,881,729 | 11/1989 | Culligan et al. | 355/318 X |

FOREIGN PATENT DOCUMENTS

| 1597166 | 4/1970 | Fed. Rep. of Germany . |
| 2257303 | 5/1973 | Fed. Rep. of Germany . |
| 3044536 | 6/1981 | Fed. Rep. of Germany . |
| 3103123 | 12/1981 | Fed. Rep. of Germany . |
| 3346512 | 7/1984 | Fed. Rep. of Germany . |
| 3631129 | 3/1987 | Fed. Rep. of Germany . |

OTHER PUBLICATIONS

Xerox Disclosure Journal, vol. 5, No. 3, May/Jun. 1980, p. 257.
Xerox Disclosure Journal, vol. 4, No. 6, Nov./Dec., 1979, pp. 743-744, 791-792.
Xerox Disclosure Journal, vol. 6, No. 5, Sep./Oct., 1981, pp. 237-238, 265-266.
IBM Technical Disclosure Bulletin, vol. 19, No. 5, Oct. 1976, pp. 1589-1591.

Primary Examiner—Fred L. Braun
Attorney, Agent, or Firm—Foley & Lardner

[57] ABSTRACT

An image forming apparatus includes a scanner, moved between the end portions of an original table, for projecting light toward the original on the table. The scanner is inclined from a direction perpendicular to the table in a direction of one end of the table to scan the original. A gate-like stopper is movable between a contact position and a separate position. At the contact position, the stopper sets the original at a position located away from the end edge of the table by a predetermined distance so that the original is set to fall outside a region where light from the scanner is attenuated. The apparatus also includes a gate of elastic sheet for allowing movement of the original from an original feed device onto the table while being elastically pushed aside by the original fed onto the table, and for guiding the original ejected from the table by an original eject device to an external guide member while resisting the original ejected from the table not to be pushed aside by the ejected original. The feed and eject devices are controlled to feed a new original while an original being ejected from the table.

11 Claims, 26 Drawing Sheets

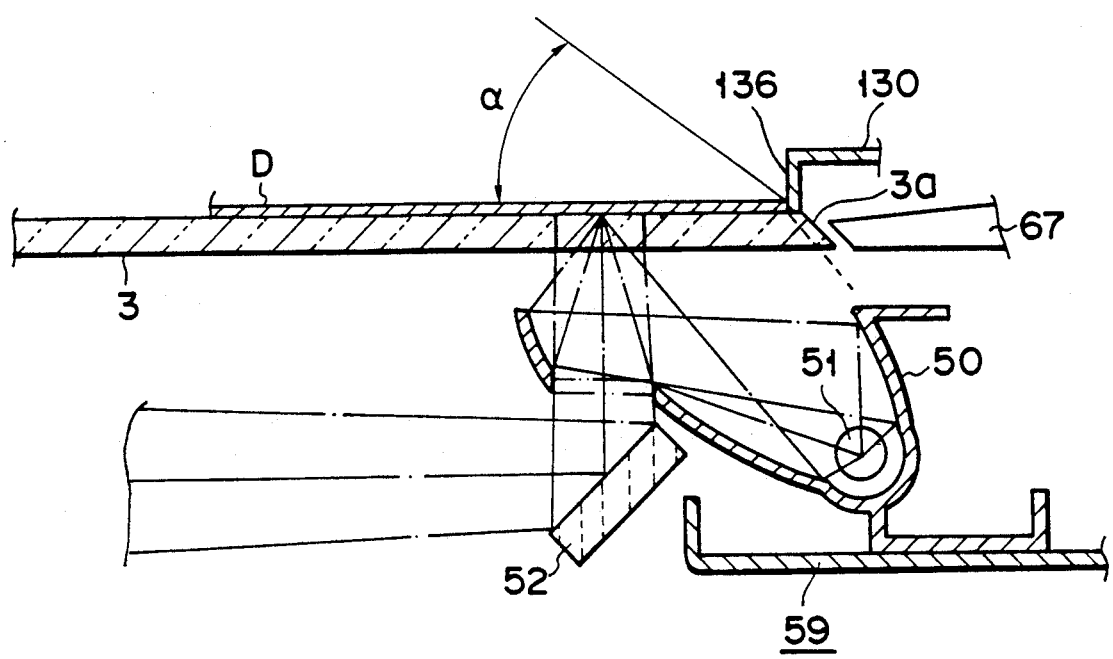
F I G. 10

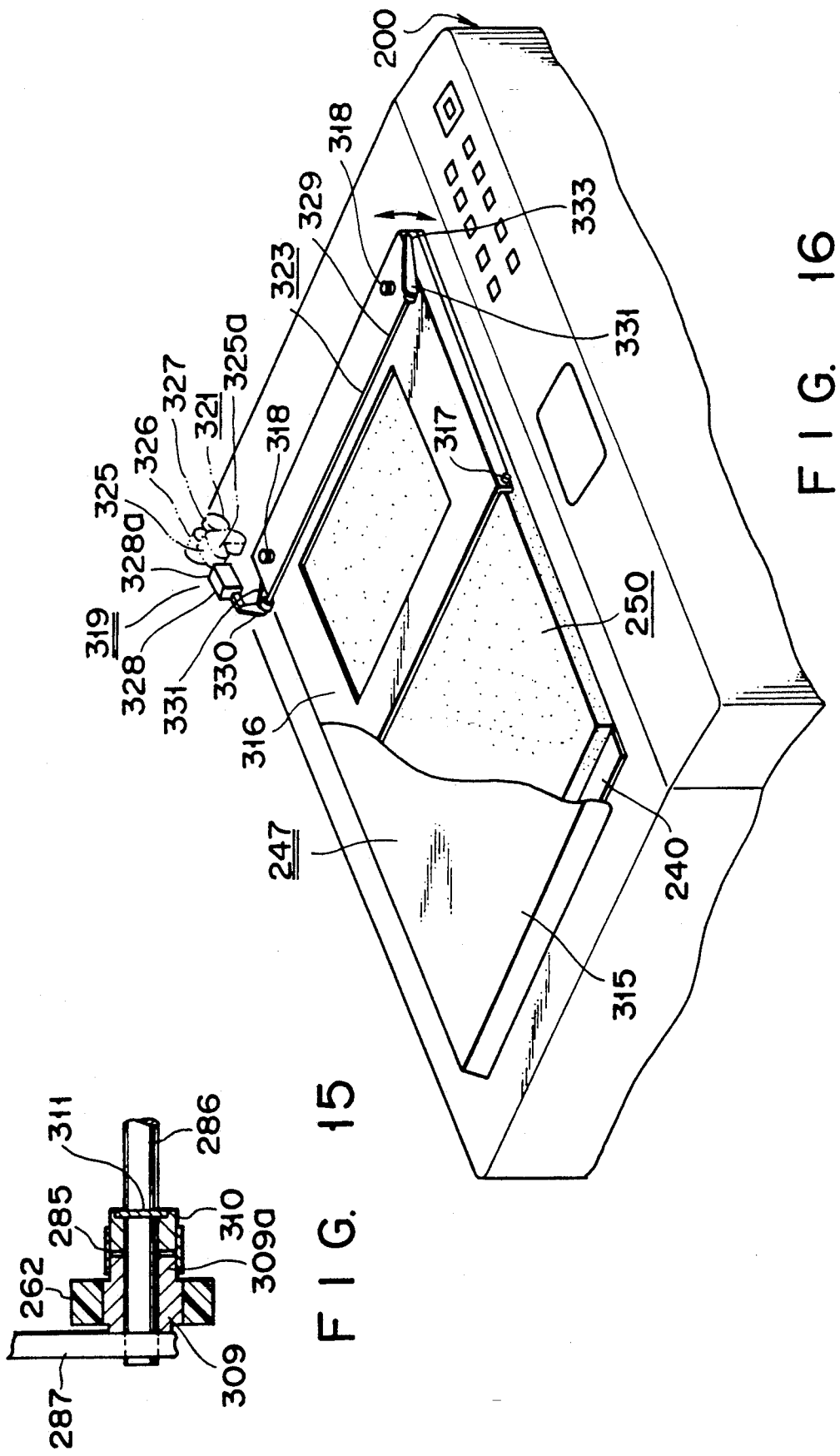

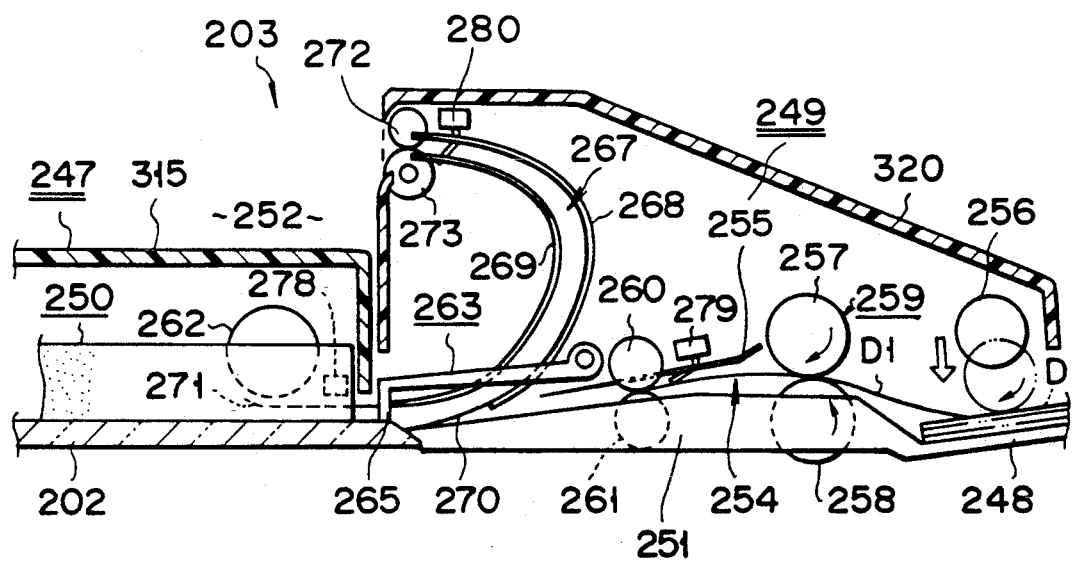
F I G. 20a
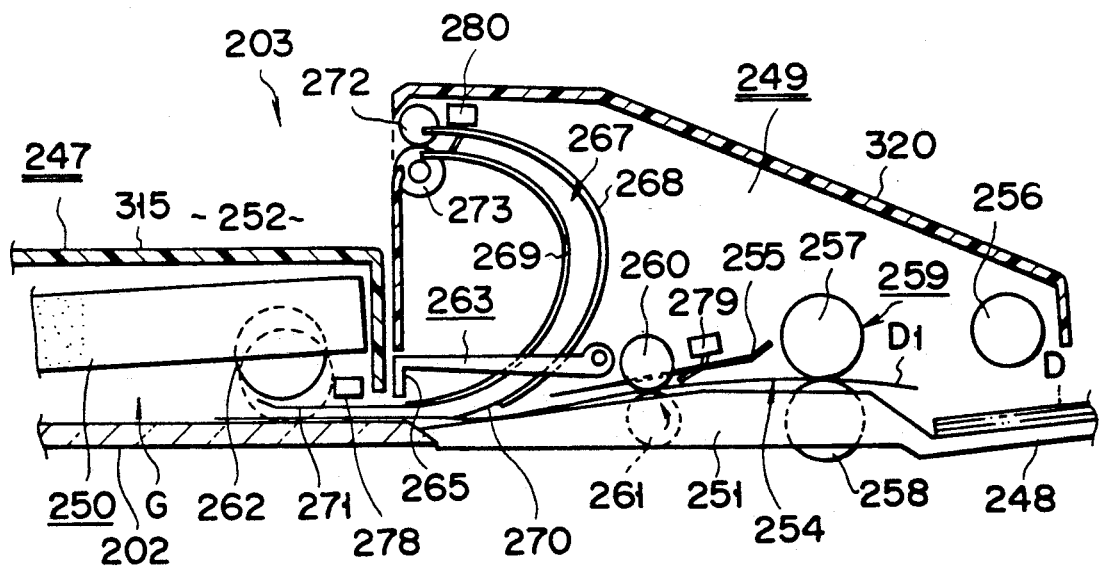
F I G. 20b

ORIGINAL SETTING DEVICE FOR IMAGE FORMING APPARATUS

BACKGROUND OF THE INVENTION

1. Field of the Invention

The present invention relates to an image forming apparatus comprising an automatic document feeder for automatically feeding an original onto an original table and for automatically ejecting the original from the original table.

2. Description of the Related Art

In a conventional image forming apparatus of this type, either when an automatic document feeder is used or when an original is manually set by an operator, an original is set on an original table with reference to one end of the original table. An exposure lamp for scanning the original set at the one end portion of the original table, with the light being moved between the one and the other end portions of the original table along the original table. Light projected from the exposure lamp toward the original table is slightly inclined from a direction perpendicular to the original table in a direction of the one end portion of the original table.

Recently, the applicant has developed an image forming apparatus in which, when an operator manually sets an original, he or she must set it at one end portion on an original table, and when an original is set on the original table by means of an automatic document feeder, it is set at the other end portion on the original table.

However, when an automatic document feeder is used in this image forming apparatus, the following problems arise. That is, since a projecting direction of light from an exposure lamp is inclined as described above, when the exposure lamp is moved to the other end portion of the original table, some light components from the exposure lamp are attenuated by the edge of the other end portion. These attenuated light components form a dark region on an original set at the other end portion on the original table as compared to a bright region irradiated with light which is not attenuated. Therefore, two dark and bright regions corresponding to the dark and bright regions are formed on a copied image, and an image in the dark region cannot be clearly reproduced.

A known automatic document feeder in the image forming apparatus comprises an original pickup means for picking up originals one by one from an original feed tray on which a plurality of originals are stacked, and a convey means for conveying an original picked up from the original feed tray toward the original table. The convey means is arranged in a cover for covering the original table, and has an endless conveyor belt having a large width and a belt drive mechanism for driving the endless conveyor belt. The convey means feeds an original picked up from the original feed tray by the original pickup means onto the original table to set it at a predetermined position on the original table, and ejects the original on the original table onto an original eject tray arranged at a side opposite to the original pickup means.

Recently, the applicant has developed an image forming apparatus comprising an automatic document feeder with which an original picked up from an original feed tray by an original pickup means is set at a predetermined position on an original table by a convey means, and after an image copying operation for the original is completed, the original on the original table is fed in a direction opposite to the feed direction from the original feed tray onto the original table to be ejected onto an original eject tray mounted on an original table cover.

In this image forming apparatus, a plurality of gate means are arranged between the original pickup means and the convey means of the automatic document feeder. These gate means direct an original, picked up from the original feed tray by the original pickup means, toward the original table, and direct the original fed from the original table by the convey means toward the original eject tray. However, the arrangements of these gate means are complicated, and their manufacturing cost is high.

In the known automatic document feeder described above, the next original cannot be fed onto the original table unless the original, set at the predetermined position on the original table, is completely ejected from the original table Therefore, it takes a long time to exchange originals on the original table. Consequently, when a large number of originals are copied, the total time required for exchanging the originals is considerable.

SUMMARY OF THE INVENTION

The present invention has been made in consideration of the above situation, and has as its first object to provide an image forming apparatus in which when an exposure lamp whose light projection direction is inclined from a direction perpendicular to an original table in a direction of one end portion of the original table is moved between one and the other end portions of the original table to scan an original on the original table, even if an original is set at a predetermined position on the other end portion of the original table, formation of a shadow on a copied image can be prevented, and a copied image can be faithfully reproduced as compared with an original image.

It is a second object of the present invention to provide a new gate means in an image forming apparatus comprising an automatic document feeder in which a feed direction of an original from an original feed tray onto an original table is opposite to a direction of ejecting an original from the original table The new gate means has a simple arrangement and low manufacturing cost and can replace a plurality of conventional gate means with a complicated arrangement and high manufacturing cost, for directing an original picked up from an original feed tray by an original pickup means toward an original table and for directing the original fed from the original table by a convey means toward an original eject tray.

It is a third object of the present invention to provide an image forming apparatus which can shorten a time required for exchanging originals on an original table and can greatly shorten the time required for copying a large number of originals.

To achieve the above described first object of this invention, an image forming apparatus of this invention comprises: an original table on which an original is set at one end portion or the other end portion thereof; scanning means, moved between the one end portion and the other end portion along the original table, for projecting light to the original to scan the original on the original table; and stopper means for setting the original at a position located away from the other end edge of the original table in the direction of the one end edge thereof by a predetermined distance at the other end portion of the original table, so that the original is set at the other end portion of the original table to fall outside a region of the other end portion where light from the scanning means is attenuated.

To achieve the above described second object of this invention, an image forming apparatus of this invention, for scanning an original set on an original table with light to form an image corresponding to an image on the original on a recording material, comprises an automatic document feeder for sequentially feeding a plurality of originals onto the original table and sequentially ejecting the originals from the original table.

The automatic document feeder includes: original feed means for sequentially feeding the plurality of originals onto the original table to set the original on the original table; original eject means for ejecting the original set on the original table in a direction opposite to an original feed direction onto the original table by the original feed means; external guide means for guiding the original ejected from the original table by the original eject means to the outside of the automatic document feeder; and an elastic sheet member, fixed at an entrance of the external guide means and projecting into an original moving path between the original feed means and the original eject means, for allowing movement of the original from the original feed means onto the original table while being elastically pushed aside by the original fed onto the original table by the original feed means, and for guiding the original ejected from the original table by the original eject means to the external guide means while resisting the original ejected from the original table not to be pushed aside by the ejected original.

To achieve the above described third object of this invention, an image forming apparatus of this invention, for scanning an original set on an original table with light to form an image corresponding to an image on the original on a recording material, comprises an automatic document feeder for sequentially feeding a plurality of originals onto the original table and sequentially ejecting the originals from the original table.

The automatic document feeder includes: original feed means for sequentially feeding the plurality of originals onto the original table to set the original on the original table; original set/eject means for setting the original fed onto the original table by the original feed means at a predetermined position on the original table, and for ejecting the original set at the predetermined position on the original table in a direction opposite to an original feed direction onto the original table by the original feed means; original externally discharge means for discharging the original ejected from the original table by the original set/eject means to the outside of the automatic document feeder; contact/separation switching means for causing the original set/eject means to be brought into contact with or separated from the original table; and control means for, when discharging of the original to the outside of the automatic document feeder by the original externally discharge means is started, causing the contact/separation switching means to separate the original set/eject means from the original table and causing the original feed means to feed the next original through a portion under the original which is being ejected.

This invention provides an image forming apparatus which can achieve the second object of this invention while achieving the first object of this invention.

Such an image forming apparatus comprises: an original table on which an original is set at one end portion or the other end portion of a surface thereof; an automatic document feeder for sequentially feeding a plurality of originals to the other end portion on the original table and sequentially ejecting the originals from the other portion on the original table; scanning means, moved between the one end portion and the other end portion along the original table, for projecting light toward the original on the original table to be inclined from a direction perpendicular to the original table in a direction of the one end portion of the original table to scan the original on the original table; and stopper means for setting the original fed to the other end portion on the original table by the automatic document feeder at a position located away from the other end edge of the original table in the direction of the one end edge thereof by a predetermined distance at the other end portion of the original table, so that the original is set at the other end portion of the original table to fall outside a region of the other end portion where light from the scanning means is attenuated.

The automatic document feeder includes: original feed means for sequentially feeding the plurality of originals onto the original table; original eject means for ejecting the original set on the original table in a direction opposite to an original feed direction onto the original table by the original feed means; external guide means for guiding the original ejected from the original table by the original eject means to the outside of the automatic document feeder; and an elastic sheet member, fixed at an entrance of the external guide means and projecting into an original moving path between the original feed means and the original eject means, for allowing movement of the original from the original feed means onto the original table while being elastically pushed aside by the original fed onto the original table by the original feed means, and for guiding the original ejected from the original table by the original eject means to the external guide means while resisting the original ejected from the original table not to be pushed aside by the ejected original.

This invention further provides an image forming apparatus which can achieve the third object of this invention while achieving the first object of this invention.

Such an image forming apparatus comprises: an original table on which an original is set at one end portion or the other end portion of a surface thereof; scanning means, moved between the one end portion and the other end portion along the original table, for projecting light toward the original on the original table to be inclined from a direction perpendicular to the original table in a direction of the one end portion of the original table to scan the original on the original table; and an automatic document feeder for sequentially feeding a plurality of originals onto the original table and sequentially ejecting the originals from the original table. The apparatus scans the original set on the original table with light to form an image corresponding to an image on the original on a recording material.

The automatic document feeder includes: original feed means for sequentially feeding the plurality of originals onto the original table; original set/eject means for setting the original fed onto the original table by the original feed means at a predetermined position on the original table, and for ejecting the original set at the predetermined position on the original table in a direction opposite to an original feed direction onto the original table by the original feed means; original externally discharge means for discharging the original ejected from the original table by the original set/eject means to the outside of the automatic document feeder; contact/separation switching means for causing the original set/eject means to be brought into contact with or separated from the original table; and control means for, when discharging of the original to the outside of the automatic document feeder by the original externally discharge means is started, causing the contact/separation switching means to separate the original set/eject means from the original table and also causing the original feed means to feed the next original through a portion under the original which is being ejected.

In the image forming apparatus, further, the original set/eject means includes stopper means for setting the original at a position located away from the other end edge of the original table in the direction of the one end edge thereof by a predetermined distance at the other end portion of the original table, so that the original is set at the other end portion of the original table, to fall outside a region of the other end portion where light from the scanning means is attenuated.

This invention also further provides an image forming apparatus which can achieve the second and third objections of this invention.

Such an image forming apparatus is for scanning an original set on an original table with light to form an image corresponding to an image on the original on a recording material, and comprises an automatic document feeder for sequentially feeding a plurality of originals onto the original table and sequentially ejecting the originals from the original table.

The automatic document feeder includes: original feed means for sequentially feeding the plurality of originals onto the original table; original set/eject means for setting the original fed onto the original table by the original feed means at a predetermined position on the original table, and for ejecting the original set at the predetermined position on the original table in a direction opposite to an original feed direction onto the original table by the original feed means; original external discharge means for discharging the original ejected from the original table by the original set/eject means to the outside of the automatic document feeder; contact/separation switching means for causing the original set/eject means to be brought into contact with or separated from the original table; control means for, when discharging of the original to the outside of the automatic document feeder by the original externally discharge means is started, causing the contact/separation switching means to separate the original set/eject means from the original table and causing the original feed means to feed the next original through a portion under the original which is being ejected; and an elastic sheet member, fixed at an entrance of the externally discharge means and projecting into an original moving path between the original feed means and the original eject means, for allowing movement of the original from the original feed means onto the original table while being elastically pushed aside by the original fed onto the original table by the original feed means, and for guiding the original ejected from the original table by the original eject means to the external guide means while resisting the original ejected from the original table not to be pushed aside by the ejected original.

This invention further provides an image forming apparatus which can achieve the first to third objects of this invention.

Such image forming apparatus comprises: an original table on which an original is set at one end portion or the other end portion of a surface thereof; scanning means, moved between the one end portion and the other end portion along the original table, for projecting light toward the original on the original table to be inclined from a direction perpendicular to the original table in a direction of the one end portion of the original table to scan the original on the original table; and an automatic document feeder for sequentially feeding a plurality of originals onto the original table and sequentially ejecting the originals from the original table. The apparatus scans the original set on the original table with light to form an image corresponding to an image on the original on a recording material.

The automatic document feeder includes: original feed means for sequentially feeding the plurality of originals onto the original table; original set/eject means for setting the original fed onto the original table by the original feed means at a predetermined position on the original table, and for ejecting the original set at the predetermined position on the original table in a direction opposite to an original feed direction onto the original table by the original feed means; original externally discharge means for discharging the original ejected from the original table by the original set/eject means to the outside of the automatic document feeder; contact/separation switching means for causing the original set/eject means to be brought into contact with or separated from the original table; control means for, when discharging of the original to the outside of the automatic document feeder by the original externally discharge means is started, causing the contact/separation switching means to separate the original set/eject means from the original table and causing the original feed means to feed the next original through a portion under the original which is being ejected; and an elastic sheet member, fixed at an entrance of the externally discharge means and projecting into an original moving path between the original feed means and the original eject means, for allowing movement of the original from the original feed means onto the original table while being elastically pushed aside by the original fed onto the original table by the original feed means, and for guiding the original ejected from the original table by the original eject means to the external guide means while registing to the original ejected from the original table not to be pushed aside by the ejected original.

The original set/eject means includes stopper means for setting the original at a position located away from the other end edge of the original table in the direction of the one end edge thereof by a predetermined distance at the other end portion of the original table, so that the original is set at the other end portion of the original table to fall outside a region of the other end portion where light from the scanning means is attenuated.

BRIEF DESCRIPTION OF THE DRAWINGS

FIG. 10 is a schematic enlarged longitudinal sectional view showing a modification of the image forming apparatus shown in FIG. 1 as in FIG. 7, in which the right end face of an original table (platen glass) is inclined in a projection direction of light from an exposure lamp;

FIG. 15 is a schematic enlarged sectional view of a rotary support mechanism including a one-way clutch, for a feed/eject roller located at a right end portion of an original table (platen glass) in the original feed/eject mechanism shown in FIG. 14;

FIG. 16 is a schematic perspective view of an arrangement of a gap forming means for a platen sheet in the original cover (platen cover) of the automatic document feeder;

FIGS. 20a to 20j are schematic longitudinal sectional views showing a process wherein an original is fed by an automatic document feeder from an original feed tray onto the right half portion of the original table (platen glass) on the upper surface of the image forming apparatus shown in FIG. 1, is set at a predetermined position on the right half portion, and is ejected onto an original eject tray on the upper surface of the original cover (platen cover) after scanning by a scanning means.

Various embodiments and modifications of the present invention will now be described in detail with reference to the accompanying drawings.

DETAILED DESCRIPTION OF THE PREFERRED EMBODIMENTS

An embodiment for achieving the first object of the present invention will be described hereinafter with reference to FIGS. 1 to 9h.

Figure 1:
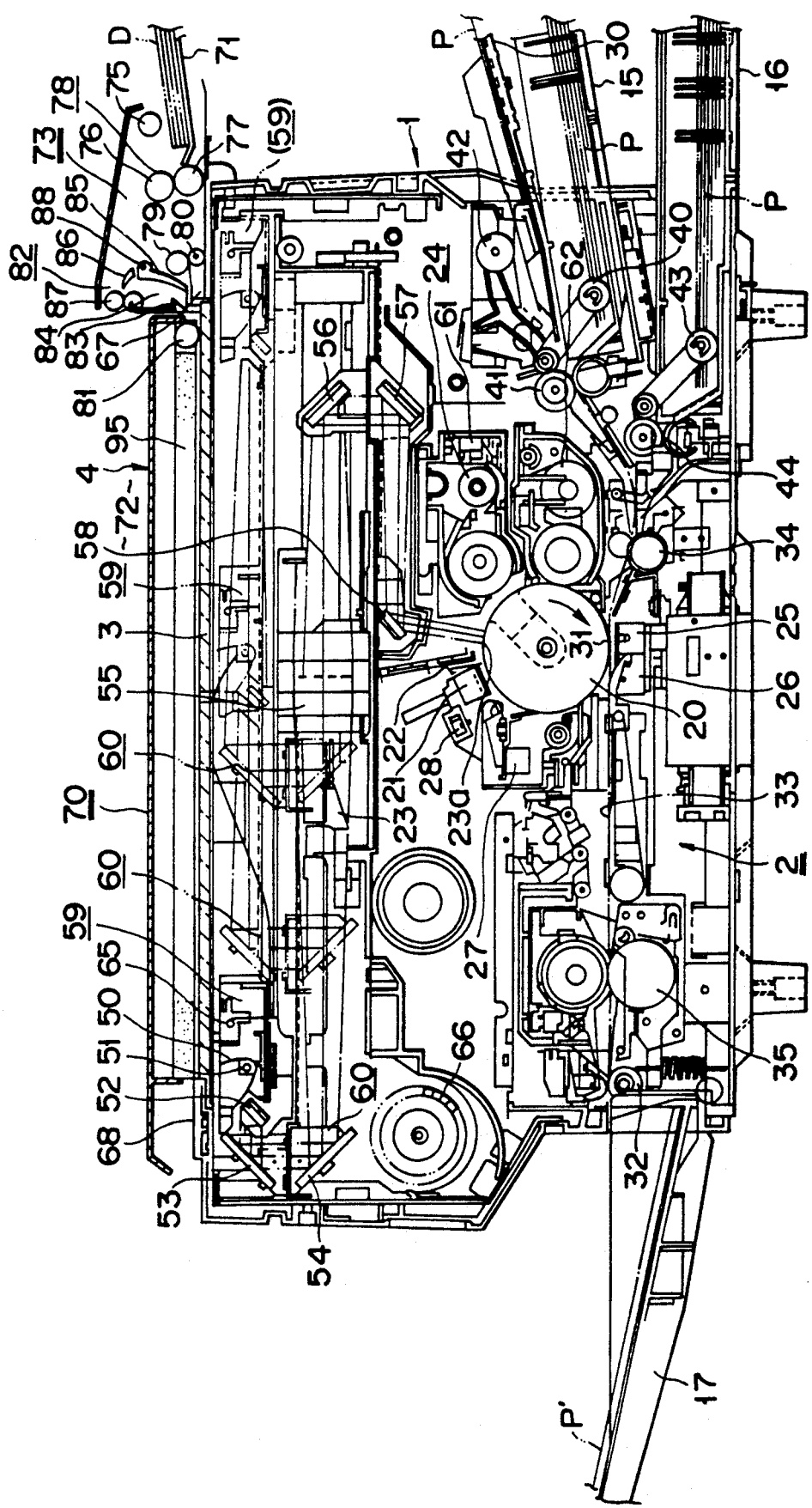
FIG. 1 is a schematic longitudinal sectional view of the overall arrangement of an embodiment of an image forming apparatus for achieving the first object of the present invention.
Figure 2:
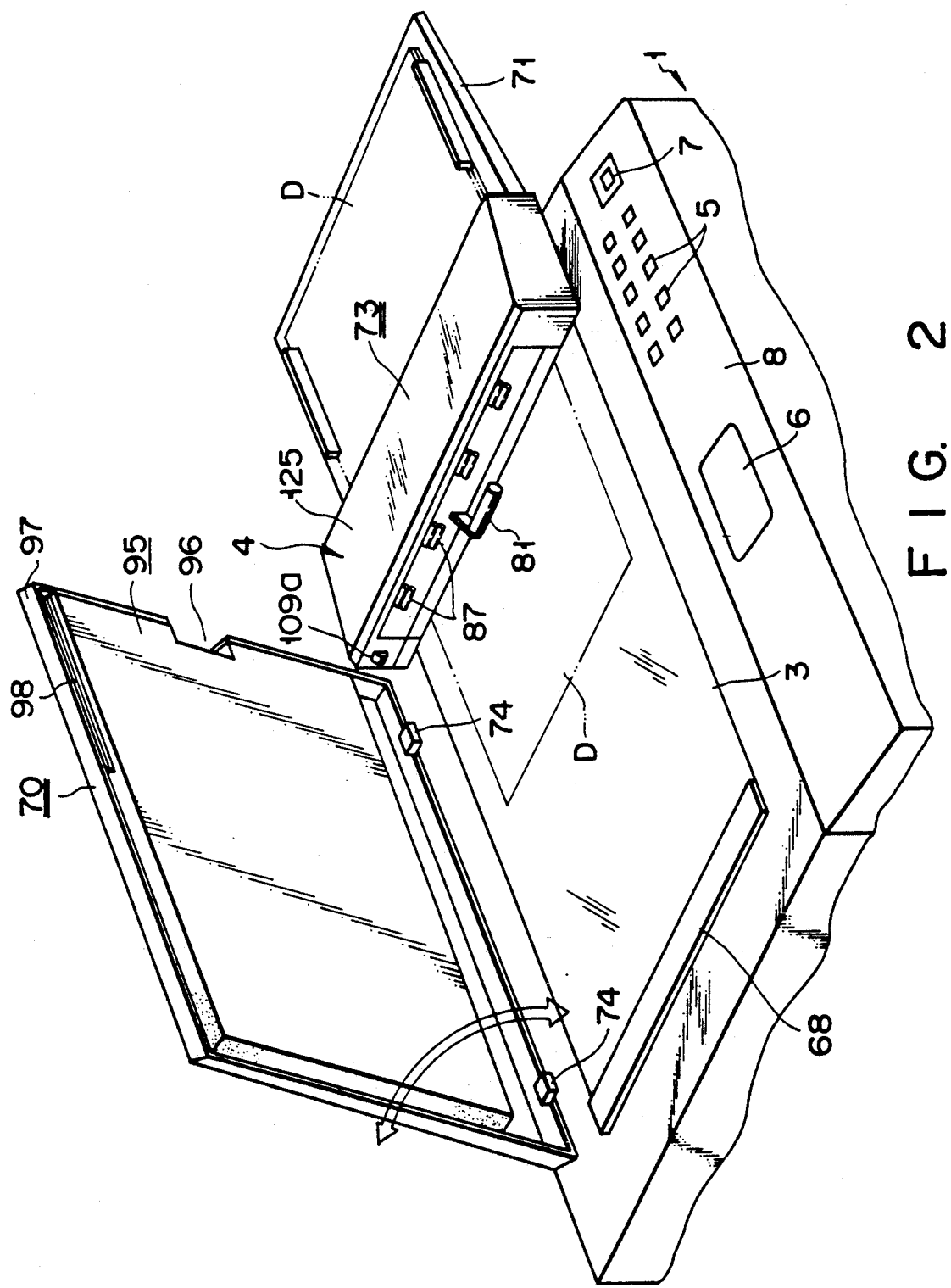
FIG. 2 is a schematic perspective view showing the upper surface of the image forming apparatus shown in FIG. 1 in a state wherein an original cover (platen cover) of an automatic document feeder provided on the upper surface is open.

In FIGS. 1 and 2, a main body 1 includes an image forming means 2 for charging, exposure, development, transfer, cleaning, fixing operations, and the like. An automatic document feeder (to be referred to as an ADF hereinafter) 4 for setting an original D on a platen glass 3 as an original table and ejecting the original D from the platen glass 3 is arranged on the upper surface of the main body 1. An operation panel 8 on which a ten-key pad 5, a guide display 6, a copy start key 7, and the like are disposed is arranged on the front edge portion of the upper surface of the main body 1, as shown in FIG. 2.

Upper and lower cassettes 15 and 16 storing different sizes of paper sheets P to be fed to the image forming means 2 are loaded in the right side surface of the main body 1. An ejected sheet tray 17 for stacking paper sheets P' subjected to image formation is loaded in the left side surface of the main body 1.

The image forming means 2 comprises a drum-like photosensitive body 20 as an image carrier arranged at almost the central portion in the main body 1. The means 2 also comprises a charging device 21, an erasing device 22, an exposure unit 23a of an exposure device 23, a developing device 24, a transfer device 25, a sheet separation device 26, a cleaning device 27, and a discharging device 28 which are sequentially arranged around the photosensitive body 20 in its rotational direction.

A paper convey path 33 is formed in the main body 1. The paper convey path 33 guides a paper sheet P, automatically fed from the upper or lower cassette 15 or 16, or a paper sheet P, manually fed through a manual feed table 30 also serving as a cover of the upper cassette 15, toward a pair of eject rollers 32 arranged near the left side surface of the main body 1 via an image transfer unit 31 between the photosensitive body 20 and the transfer device 25.

A pair of aligning rollers 34 are arranged at the upstream side of the image transfer unit 31 along the paper convey path 33, and a fixing device 35 is arranged at the downstream side thereof.

A pickup roller 40, attached to a swingable arm, for picking up paper sheets P one by one from the upper cassette 15 and a separation convey means 41 for receiving the paper sheet P from the pickup roller 40 and feeding it toward the upstream end of the paper convey path 33 are disposed near the loading portion of the upper cassette in the main body 1. The separation convey means 41 comprises a convey roller and a separation roller. A manual feed roller 42 for feeding a paper sheet P manually fed from the manual feed table 30 toward the upstream end of the paper convey path 33 is disposed near the inner edge of the manual feed table 30 in the main body 1.

A pickup roller 43, attached to a swingable arm, for picking up paper sheets P one by one from the lower cassette 16 and a separation convey means 44 for receiving the paper sheet P from the pickup roller 43 and feeding it toward the upstream end of the paper convey path 33 are disposed near the loading portion of the lower cassette in the main body 1. The separation convey means 44 comprises a convey roller and a separation roller.

The exposure device 23 is constituted by an exposure lamp 51, a reflector 50 surrounding a back portion of the exposure lamp 51 to project light from the exposure lamp 51 onto an original D set on the platen glass 3 arranged on the upper surface of the main body 1, a first mirror 52, a second mirror 53, a third mirror 54, a lens 55, a fourth mirror 56, a fifth mirror 57, and a sixth mirror 58. These mirrors and lens sequentially guide light reflected by the original toward the photosensitive body 20. The direction of light emitted from the exposure lamp 51 is slightly inclined by the reflector 50 from a direction perpendicular to the platen glass 3 in a direction of a left scale 68 (to be described in detail later).

The exposure lamp 51, the reflector 50, and the first mirror 52 are mounted on a first carriage 59 which can be reciprocally moved between the left and right ends of the platen glass 3 along the lower surface of the platen glass 3. The second and third mirrors 53 and 54 are mounted on a second carriage 60 which is moved in the same direction as the moving direction of the first carriage 59 at a speed half that of the first carriage 59. These first and second carriages 59 and 60 scan the original D set on the platen glass 3 while they are moved from the left end position indicated by the solid line in FIG. 1 to the right, thus exposing an electrostatic latent image corresponding to an image on the original D on the peripheral surface of the photosensitive body 20.

The developing device 24 comprises an upper developing unit 61 for color development and a lower developing unit 62 for black development. Thus, development by black or another color (e.g., red) can be selected.

A spot light source unit 65 for, when an original D is to be copied while its given region is erased, designating the region is mounted on the first carriage 59. The erasing device 22 erases a charge of a portion, corresponding to the designated region, of an electrostatic latent image formed on the peripheral surface of the photosensitive body 20. A cooling fan 66 is arranged above the fixing device 35 in the main body 1.

An original D up to a maximum of an A3 size (defined by Japanese Industrial Standardization PO138: 297×420 mm) or of Ledger size for a non-domestic use can be set on the platen glass 3.

Note that the charging device 21, the erasing device 22, the exposure device 23, the developing device 24, the transfer device 25, the sheet separation device 26, the cleaning device 27, the discharging device 28, and the fixing device 35 have known arrangements, and a detailed description thereof will be omitted.

As shown in FIGS. 1 and 2, the ADF 4 mainly comprises an original cover (to be referred to as a platen cover hereinafter) 70 for covering the platen glass 3, an original feed tray 71 which extends to the right from the right end portion of the upper surface of the main body 1 and can simultaneously receive a plurality of originals D, and an original feed/eject mechanism 73 arranged between the platen cover 70 and the original feed tray 71 on the upper surface of the main body 1. The original feed/eject mechanism 73 sequentially picks up originals D on the original feed tray 71 one by one to feed the picked-up original into a gap between a platen sheet 95 (to be described in detail later) of the platen cover 70 and the platen glass 3, and sets the original D at a predetermined position on the platen glass 3 with reference to a right scale 67. Upon completion of the exposure operation, the mechanism 73 ejects the original D from the gap between the platen sheet 95 and the platen glass 3 onto an original eject tray 72 provided on the upper surface of the platen cover 70.

As shown in FIG. 2, the rear end portion of the platen cover 70 is attached on the rear end portion of the upper surface of the main body 1 through a pair of hinge members 74, and is openable/closable with respect to the platen glass 3. The pair of hinge members 74 are movable in the vertical direction within a predetermined range with respect to the upper surface of the main body 1. Thus, when a thick original such as a book is to be copied, the platen sheet 95 of the platen cover 70 can be uniformly pressed against the thick original to be parallel to the platen glass 3.

Figure 3:
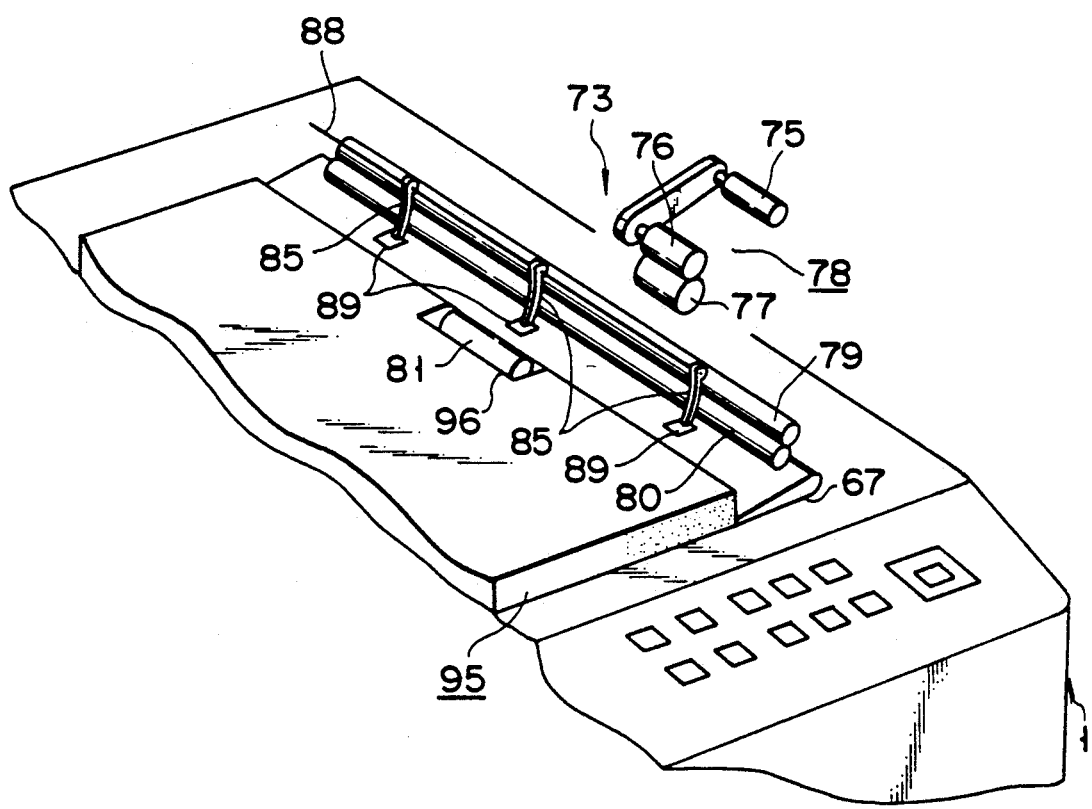
FIG. 3 is a schematic perspective view of an arrangement of an original feed/eject mechanism of the automatic document feeder.

As shown in FIGS. 1 and 3, the original feed/eject mechanism 73 has a pickup roller 75 which is vertically movable with respect to original D set on the original feed tray 71, and a feed roller 76 and a separation roller 77 which are in contact with each other in the vertical direction at a position located away from the pickup roller 75.

A feed/eject roller 81 is arranged above the right end of the upper surface of the platen glass 3 along the left edge of the right scale 67. The roller 81 can be brought into contact with or separated from the platen glass 3. The feed/eject roller 81 is selectively rotated in the forward/reverse direction by a drive means (not shown) to feed an original D from a pair of registration rollers 79 and 80 onto the platen glass 3 or to eject the original D from the platen glass 3.

An original eject means 82 is arranged above the right scale 67 between the feed/eject roller 81 and the paired registration rollers 79 and 80. The means 82 ejects the original D picked up from the platen glass 3 by the feed/eject roller 81 onto the original eject tray 72 on the upper surface of the platen cover 70. The original eject means 82 is constituted by a first guide plate 83, the lower end of which is arranged near the distal end of the right scale 67, a plurality of gates 85 extending vertically along the paired registration rollers 79 and 80 and forming an original eject path 84 between themselves and the first guide plate 83, second guide plates 86, coupled to the plurality of gates 85, for directing the original eject path 84 toward the upper surface of the platen cover 70, and a pair of eject rollers 87 disposed at the terminal end of the original eject path 84. The plurality of gates 85 are pivotally mounted on a horizontal shaft 88, and their lower end portions are fitted in a plurality of grooves 89 formed on the upper surface of the right scale 67.

Figure 4:
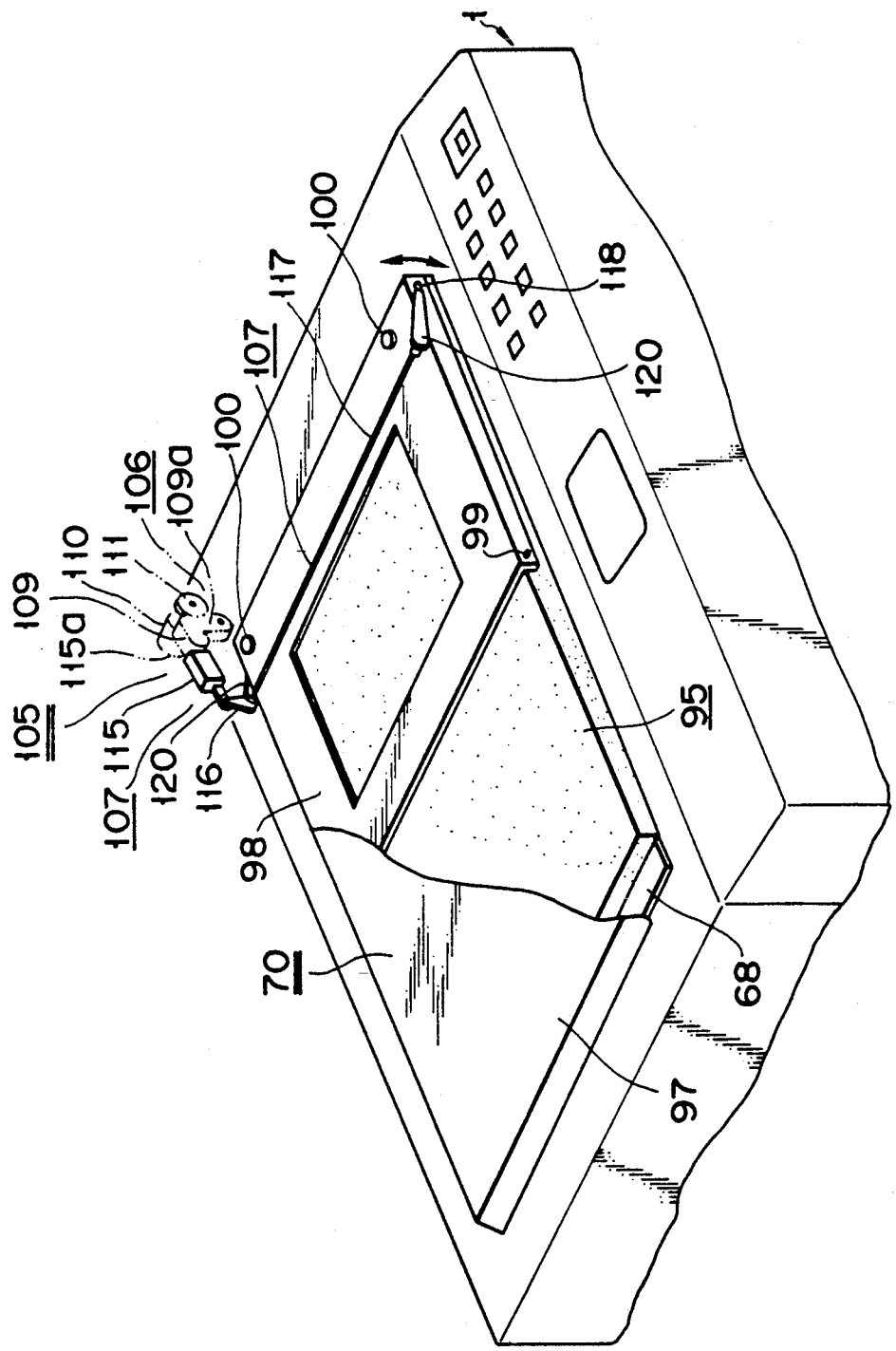
FIG. 4 is a schematic perspective view of an arrangement of a gap forming means for a platen sheet in the original cover (platen cover) of the automatic document feeder.
Figure 5:
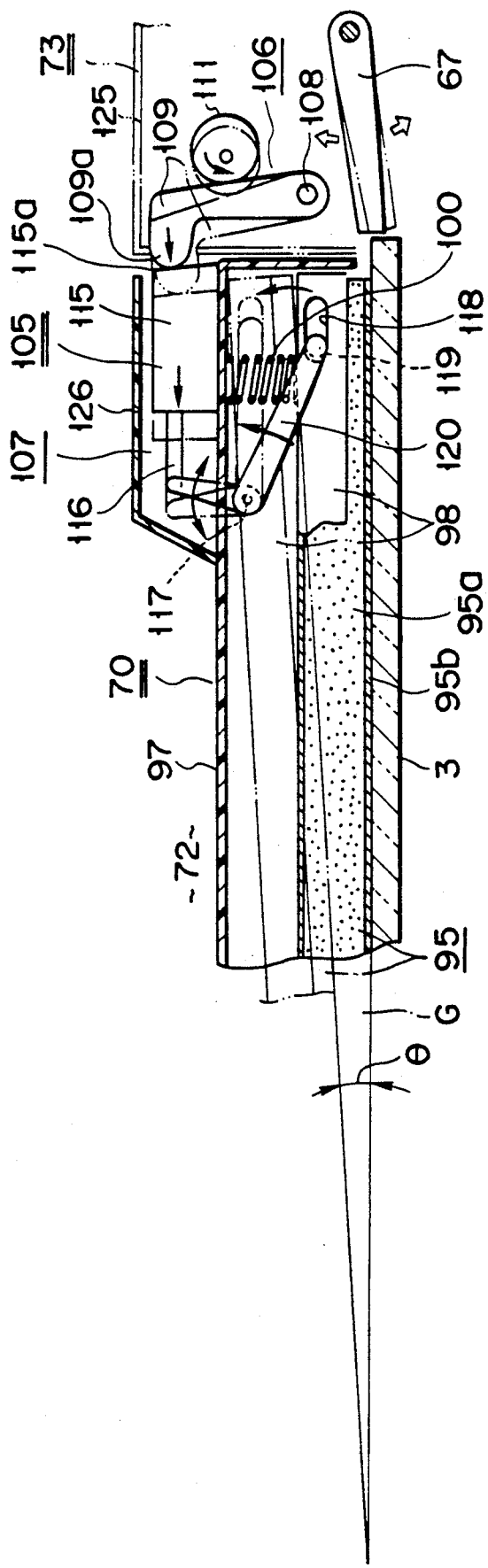
FIG. 5 is a schematic enlarged longitudinal sectional view showing in detail the arrangement of the gap forming means.

FIGS. 4 and 5 schematically show the structure of the platen cover 70. The platen sheet 95 of the platen cover 70 has substantially the same planar dimensions as those of the platen glass 3, and is constituted by an elastic member 95a of urethane or the like, and a white sheet 95b having a low coefficient of friction and adhered to the lower surface of the elastic member 95a. A notch 96 which receives the feed/eject roller 81 is formed at the center of the right end of the platen sheet 95 (FIG. 3).

The platen sheet 95 is covered with a cover main body 97 excluding its lower surface. The cover main body 97 is attached on the rear end portion of the upper surface of the main body 1 through the pair of hinge members 74 (FIG. 2). The left half portion of the platen sheet 95 is directly fixed to the left half portion of the inner recess of the cover main body 97, and its right half portion is adhered to a movable frame 98 pivotally mounted on the right half portion of the inner recess of the cover main body 97.

The movable frame 98 is supported on the cover main body 97 by pivot supports 99 (only the front one is illustrated) at substantially the center of the cover main body 97 in its right-and-left direction. Compression springs 100 as urging means are disposed between the free end portion (right end portion) of the upper surface of the movable frame 98 and the bottom surface of the recess of the cover main body 97. The compression springs 100 always urges the free end portion of the movable frame 98 downward, as indicated by a solid line in FIG. 5, to bring the entire platen sheet 95 into tight contact with the platen glass 3. In this state, the movable frame 98 is in a horizontal state.

The movable frame 98 can be pivoted upward by a predetermined angle against the urging forces of the compression springs 100 by a gap forming means 105 (to be described in detail later). In FIG. 5, the movable frame 98 pivoted to an upward position is illustrated by a two-dot chain line. In this state, a gap G having an angle $\theta$ and a length l is formed under the right half portion of the lower surface of the platen sheet 95.

As shown in FIGS. 4 and 5, the gap forming means 105 comprises a drive mechanism 106 arranged in a cover 125 covering the original feed/eject mechanism 73, and a power transmission mechanism 107, arranged in a cover 126 attached to the right end portion of the plate cover 70, for transmitting a force generated by the drive mechanism 106 to the movable frame 98.

The drive mechanism 106 is constituted by an inverted L-shaped pusher 109 which is pivotal about a shaft 108 as a fulcrum, and an eccentric cam roller 111 using a motor 110 as a drive source. Since the pusher 109 is urged by an urging means (not shown) to be kept in contact with the peripheral surface of the eccentric cam roller 111, rotation of the eccentric cam roller 111 causes a swing movement by the pusher 109, and a side projecting portion 109a of the pusher 109 projects from, or is retracted in an opening formed in the left end face of the cover 125.

The power transmission mechanism 107 has a slider 115, one end face 115a of which opposes the side projecting portion 109a of the pusher 109. The slider 115 is reciprocal in the moving direction of the side projecting portion 109a of the pusher 109. The other end face of the slider 115 is coupled, through a link mechanism 116, to one end of a shaft 117 which is rotatably supported in a space between the bottom surface of the recess of the cover main body 97 and the upper surface of the movable frame 98. Pivot levers 120 extending toward the free end portions of the two side walls of the movable frame 98 are fixed on the two ends of the shaft 117. The extending ends of the pivot levers 120 support guide rollers 119 engaged with horizontal guide grooves 118 formed in the free end portions at the two side walls of the movable frame 98. In the power transmission mechanism 107, the sliding movement of the slider 115 is converted to rotation of the shaft 117 by the link mechanism 116. The shaft 117 pivots the pair of pivot levers 120 within a predetermined angular range.

In the gap forming means 105, in a still state, a minimum eccentric position on the peripheral surface of the eccentric cam roller 111 is in contact with the right end face of the upward extending portion of the pusher 109, as indicated by a solid line in FIG. 5. The side projecting portion 109a of the pusher 109 is retracted in the cover 125 for the original feed/eject mechanism 73. Therefore, since the side projecting portion 109a of the pusher 109 does not push one end face 115a of the slider 115, the movable frame 98 is urged by the compression springs 100 so that the entire surface of the platen sheet 95 is brought into tight contact with the platen glass 3. In this state, the movable frame 98 is in a horizontal state.

When an original D is fed onto or ejected from the platen glass 3, the output shaft of the motor 110 is driven to rotate the eccentric cam roller 111 by 180° in response to a signal from a control unit (not shown). As a result, as indicated by a two-dot chain line in FIG. 5, a maximum eccentric position on the peripheral surface of the eccentric cam roller 111 is brought into contact with the right end face of the pusher 109. For this reason, the pusher 109 is pivoted so that its side projecting portion 109a projects from the opening in the left end face of the cover 125. The slider 115 is then pushed by the side projecting portion 109a of the pusher 109 and is slid to the left in the cover 126 for the power transmission mechanism 107. This movement of the slider 115 causes counterclockwise pivotal movement of the pivot levers 120. As a result, the movable frame 98 is pivoted counterclockwise about the pivot supports 99 so that its free end portion is pushed up against the urging forces of the compression springs 100. The right half portion of the platen sheet 95 is separated upward from the platen glass 3 and the gap G having the angle $\theta$ and the length l is formed below the right half portion of the lower surface of the platen sheet 95, as indicated by a solid line in FIG. 6 and a two-dot chain line in FIG. 5.

A stopper member 130 for positioning an original D at the right end portion on the platen glass 3 is arranged in the cover 125 for the original feed/eject mechanism 73.

Figure 7:
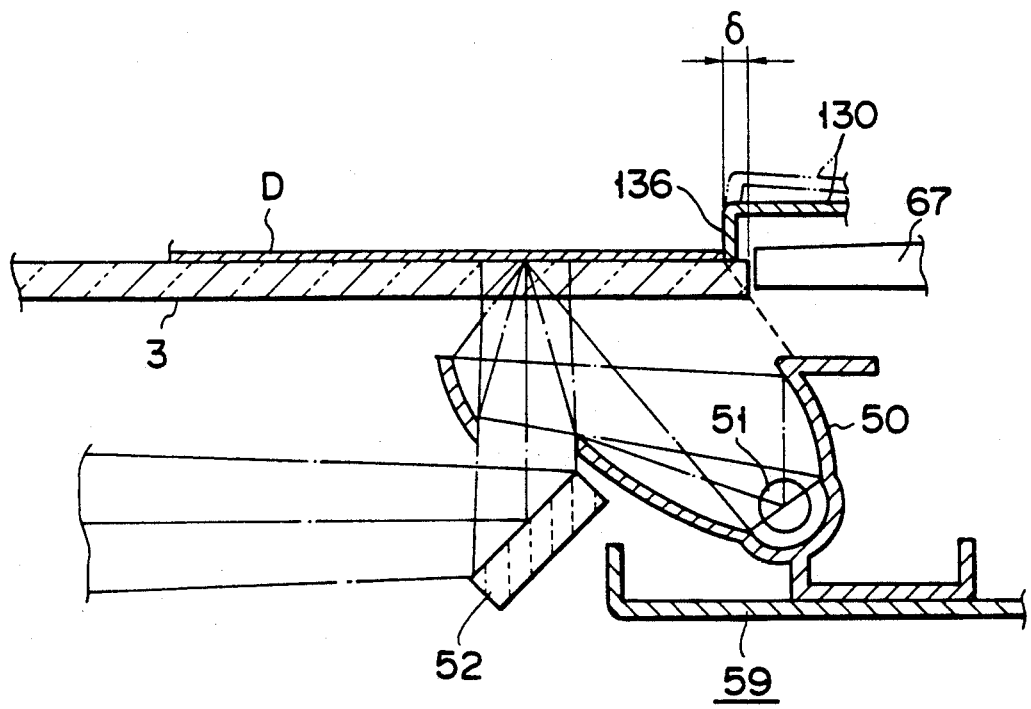
FIG. 7 is a schematic enlarged longitudinal sectional view of a relative positional relationship between light projecting from an exposure lamp toward the original table (platen glass) and a stopper member as an original set reference at the right end of the original table (platen glass) when the exposure lamp of a scanning means is moved along the under surface of the original table (platen glass) toward the right end of the table, the table being located on the upper surface of the image forming apparatus shown in FIG. 1.
Figure 8:
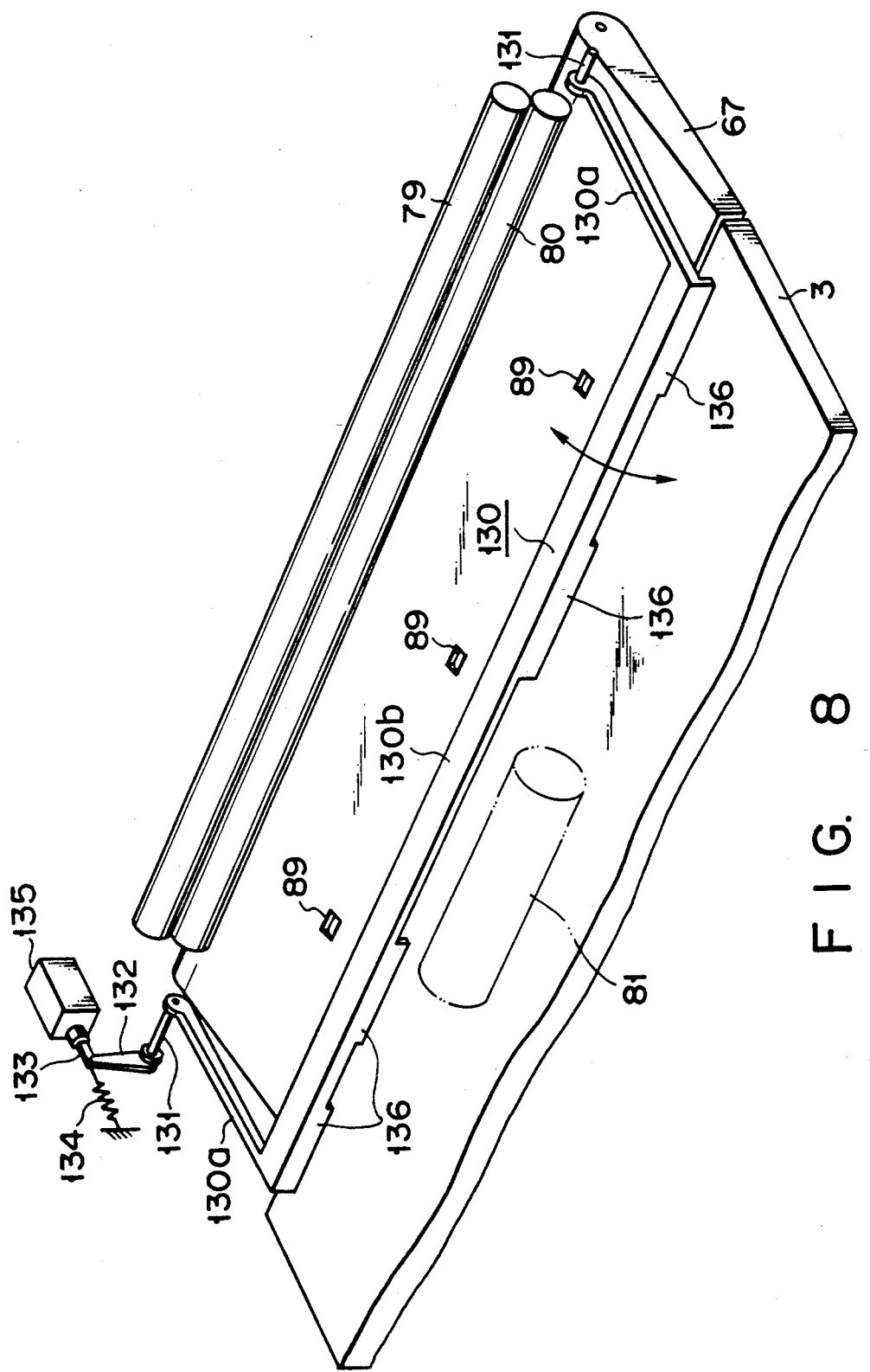
FIG. 8 is a schematic perspective view of a drive mechanism for the stopper member shown in FIG. 7 on the upper surface of the apparatus.

FIGS. 7 and 8 show the stopper member 130. The stopper member 130 is constituted by a pair of arms 130a extending along the front and rear edges of the right scale 67 and a beam portion 130b coupling the left end portions (ends near the glass plate 3) of the pair of arms 130a. The stopper member 130 is pivotal about shafts 131 provided to the outer side surfaces of the right end portions (ends far away from the platen glass 3) of the pair of arms 130a. One of these shafts 131 is coupled to a plunger 133 through a link member 132. The plunger 133 is urged in one direction by a spring 134, and projects from or is retracted in a solenoid 135 upon energization/deenergization of the solenoid 135. Therefore, when the solenoid 135 is energized/deenergized, the stopper member 130 is pivoted in a direction of an arrow in FIG. 8 through the plunger 133 and the link member 132.

Contact portions 136 each of which projects downward and with which an original is in contact are provided to the beam portion 130b of the stopper member 130. The contact portions 136 are arranged at a position located away from the free end of the right scale 67 by a predetermined distance δ on the platen glass 3 while being in contact with the platen glass 3, as shown in FIG. 7. The distance δ is set to be large enough to avoid formation of a shadow within a region of light projected from the exposure lamp 51 toward the platen glass 3 by the edge portion of the glass 3 adjacent to the right scale 67 when the exposure lamp 51 is moved to a position below the right scale 67. Therefore, when the right end of an original D is brought into contact with the contact portions 136 of the stopper member 130 at the right end portion on the platen glass 3, the right end of the original D is located outside the shadow. Therefore, the entire original D can be exposed with uniform light from the exposure lamp 51. Since no shadow is formed on the original D by the right end portion of the platen glass 3, the entire image on the original D set at the predetermined position of the right end portion on the platen glass 3 can be copied on a paper sheet P by the image forming means 2.

Feed and eject operations of an original D to and from the predetermined position of the right end portion on the platen glass 3 by the ADF 4 will be described below with reference to FIGS. 9a to 9h.

Figure 9A:
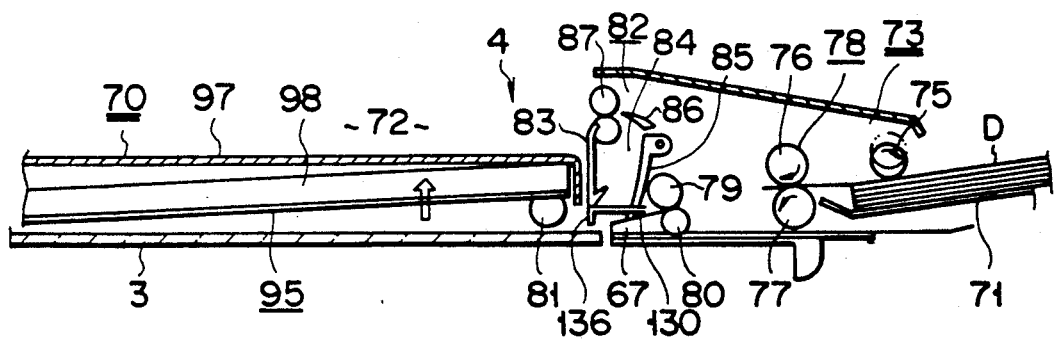
FIGS. 9a to 9h are schematic longitudinal sectional views showing a process wherein an original is fed from an original feed tray onto the right half portion of the original table (platen glass) on the upper surface of the image forming apparatus shown in FIG. 1 by an automatic document feeder, is set at a predetermined position on the right half portion, and is ejected onto an original eject tray on the upper surface of the original cover (platen cover) after scanning by a scanning means.

As shown in FIG. 9a, a plurality of originals D are simultaneously set on the original feed tray 71 with their image surfaces facing downward, and the copy start key 7 (FIG. 2) is then depressed. Thus, the pickup roller 75 of the original feed/eject mechanism 73 is moved downward, and is brought into contact with the uppermost original D on the original feed tray 71. The pickup roller 75, the feed roller 76, and the separation roller 77 are then rotated, and the uppermost original D on the original feed tray 71 is picked up to the left from the original feed tray 71.

Figure 6:
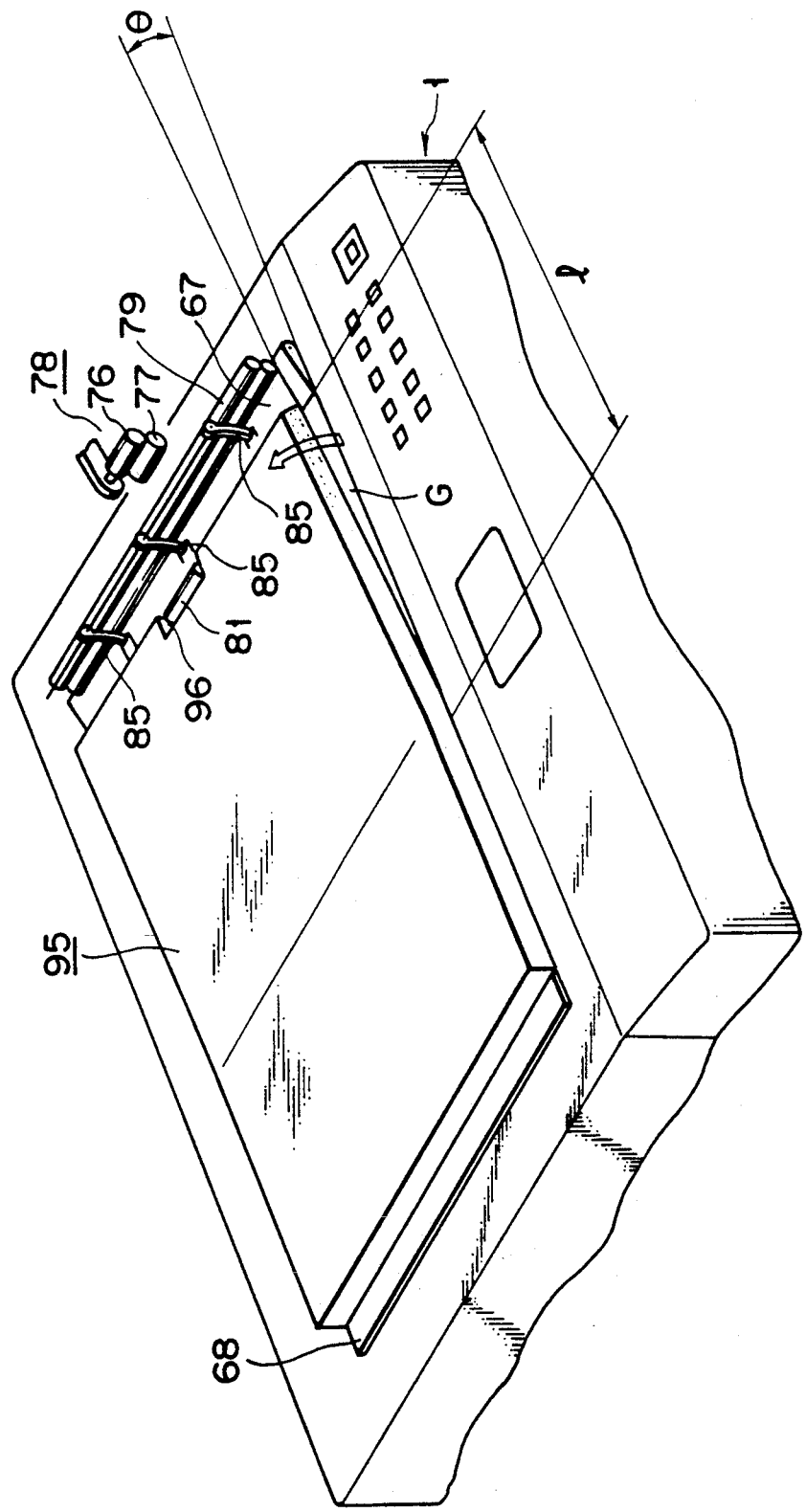
FIG. 6 is a schematic perspective view of the platen sheet in a state wherein a wedge-shaped gap is formed between the platen sheet and the right half portion of the original table (platen glass) on the upper surface of the image forming apparatus shown in FIG. 1 by the gap forming means on the upper surface of this apparatus.

In this state, the drive mechanism 106 of the gap forming means 105 is operated to push the slider 115 by the pusher 109, as has been described above with reference to FIGS. 4 and 5. As a result, as shown in FIG. 6, the gap G having the angle θ and the length l is formed between the right half portion of the upper surface of the platen glass 3 and the right half portion of the lower surface of the platen sheet 95.

Figure 9B:
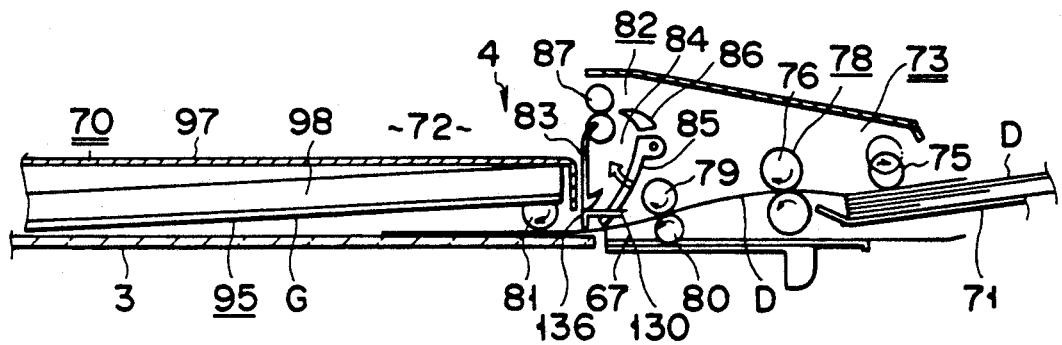

The leading end of the original D picked up from the original feed tray 71 abuts against the paired registration rollers 79 and 80 in a stopped state, so that the leading end is parallel to the contact line between the registration rollers 79 and 80. When the registration rollers 79 and 80 are rotated, the original D is conveyed to the left. In this case, as shown in FIG. 9b, the stopper member 130 is rotated so that its contact portions 136 are separated from the platen glass 3. Therefore, the original D from the registration rollers 79 and 80 is conveyed between the right scale 67 and the contact portions 136 of the stopper member 130 while pushing aside the gates 85 of the original eject means 82. The original D which has reached the right end portion of the platen glass 3 is conveyed to the left along the platen glass 3 upon rotation of the feed/eject roller 81 in the platen cover 70. In this case, if the length of the original D in its convey direction is larger than the length l of the gap G, since the platen glass 3 and the white sheet 95b on the lower surface of the platen sheet 95 are low-friction members, the leading end (left end) of the original D can smoothly enter a slit between the platen sheet 95 and the platen glass 3 without being bent or curved.

Figure 9C:
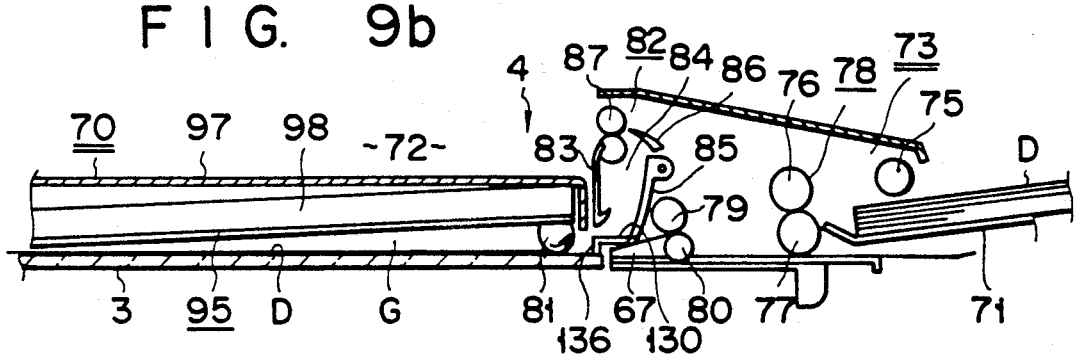

When a sensing means (not shown) detects that the trailing end (right end) of the original D is moved to a position slightly leftwardly located away from the contact portions 136 of the stopper member 130, the solenoid 135 (FIG. 8) for driving the stopper member 130 is driven and the contact portions 136 of the stopper member 130 is brought into contact with the upper surface of the platen glass 3. The feed/eject roller 81 is slightly rotated in the reverse direction to slightly move the original D on the platen glass 3 to the right. When the right end of the original D abuts against the contact portions 136 of the stopper member 130, as shown in FIG. 9c, the rotation of the feed/eject roller 81 is stopped.

Figure 9D:
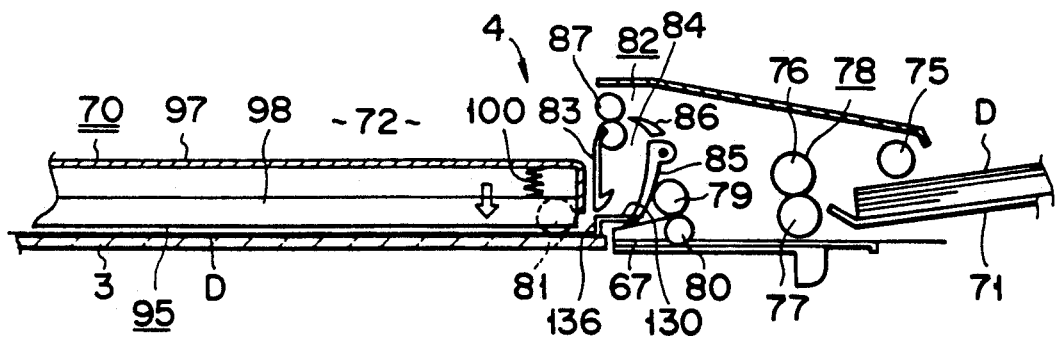

Thereafter, the drive mechanism 106 of the gap forming means 105 is operated to cancel the pushing operation of the slider 115 by the pusher 109. Thus, the movable frame 98 is moved to a horizontal state by the restoration forces of the compression springs 100, as shown in FIG. 9d. Thus, the original D positioned on the platen glass 3 with reference to the right scale 67 is brought into tight contact with the platen glass 3 by the right half portion of the platen sheet 95 attached to the movable frame 98.

When setting of the original D at the predetermined position of the right end portion on the upper surface of the platen glass 3 is completed by the ADF 4 in this manner, the original is scanned by the exposure device 23 (FIG. 1) in the main body 1. An image on the original D is then copied on a paper sheet P by the charging device 21, the developing device 24, the transfer device 25, the sheet separation device 26, the cleaning device 27, the discharging device 28, the fixing device 35, and the like.

Figure 9E:
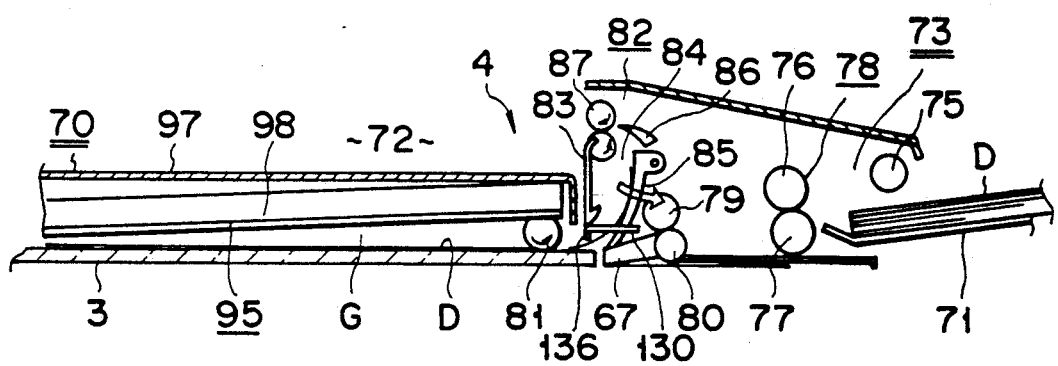
Figure 9F:
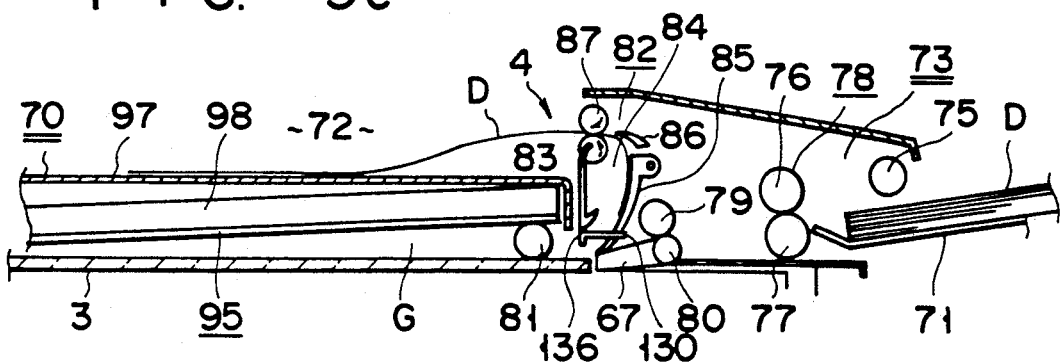
Figure 9G:
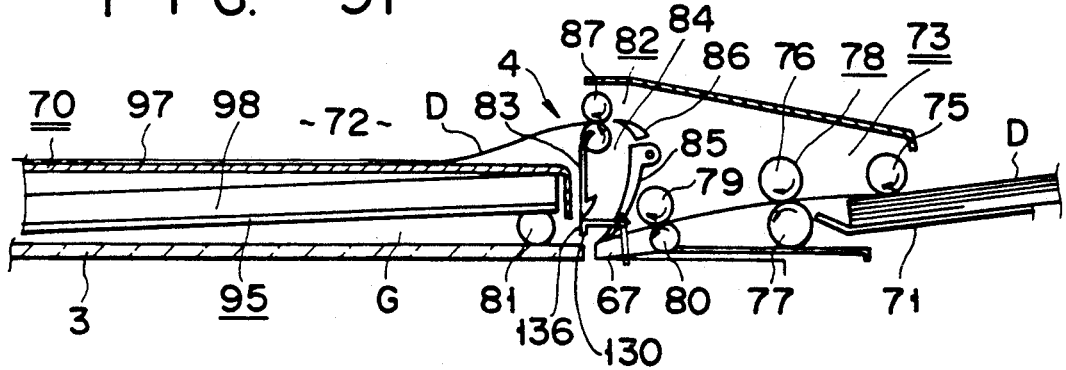

Upon completion of the copying operation, as shown in FIG. 9e, the stopper member 130 is separated from the platen glass 3, and the platen sheet 95 is moved upward to form the gap G. Then, the feed/eject roller 81 is rotated to convey the original D on the platen glass 3 to the right. The original D collides against the gates 85 to be guided into the original eject path 84. As shown in FIG. 9f, the original D is ejected onto the original eject tray 72 on the upper surface of the cover main body 97 by the pair of eject rollers 87. In this embodiment, as shown in FIG. 9g, when the leading end of the original D to be ejected onto the original eject tray 72 is pinched between the eject rollers 87, the pickup operation (FIGS. 9a and 9b) of the next one of originals D on the original feed tray 71 is started.

Figure 9H:
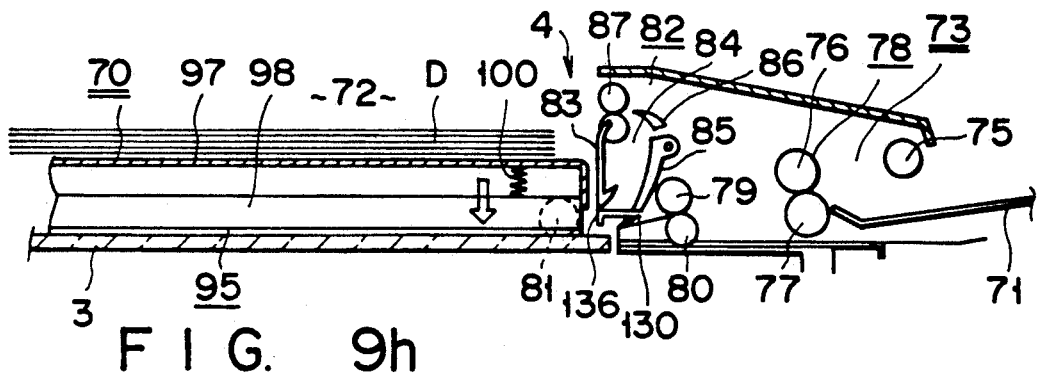

In this manner, when the copying operations of all the originals D on the original feed tray 71 are performed and all the originals D are ejected onto the original eject tray 72, an initial state wherein the movable frame 98 in the platen cover 70 is set in the horizontal state and the right half portion of the platen sheet 95 is pressed against the platen glass 3 is set, as shown in FIG. 9h.

FIG. 10 shows a main part of a second embodiment for achieving the first object of the present invention. In this embodiment, a right end surface 3a of the platen glass 3 is inclined to be directed in an upper right direction. An inclination angle $\theta$ of the right end surface 3a is set so that the end surface 3a is parallel to light projected from a reflector 50 of an exposure lamp 51 to the platen glass 3 when the exposure lamp 51 is moved to the right end of the platen glass 3.

When the exposure lamp 51 is moved to the right end of the platen glass 3, the inclined right end surface 3a of the platen glass 3 can prevent light projected from the exposure lamp 51 from forming a shadow of the right end portion of the platen glass 3 on the original D set at the predetermined position of the right end portion of the platen glass 3. Thus, a quantity of light from the exposure lamp 51 to the original D can be increased.

Another embodiment capable of achieving the second and third objects of the present invention as well as the first object will be described below with reference to FIGS. 11 to 21b.

Figure 11:
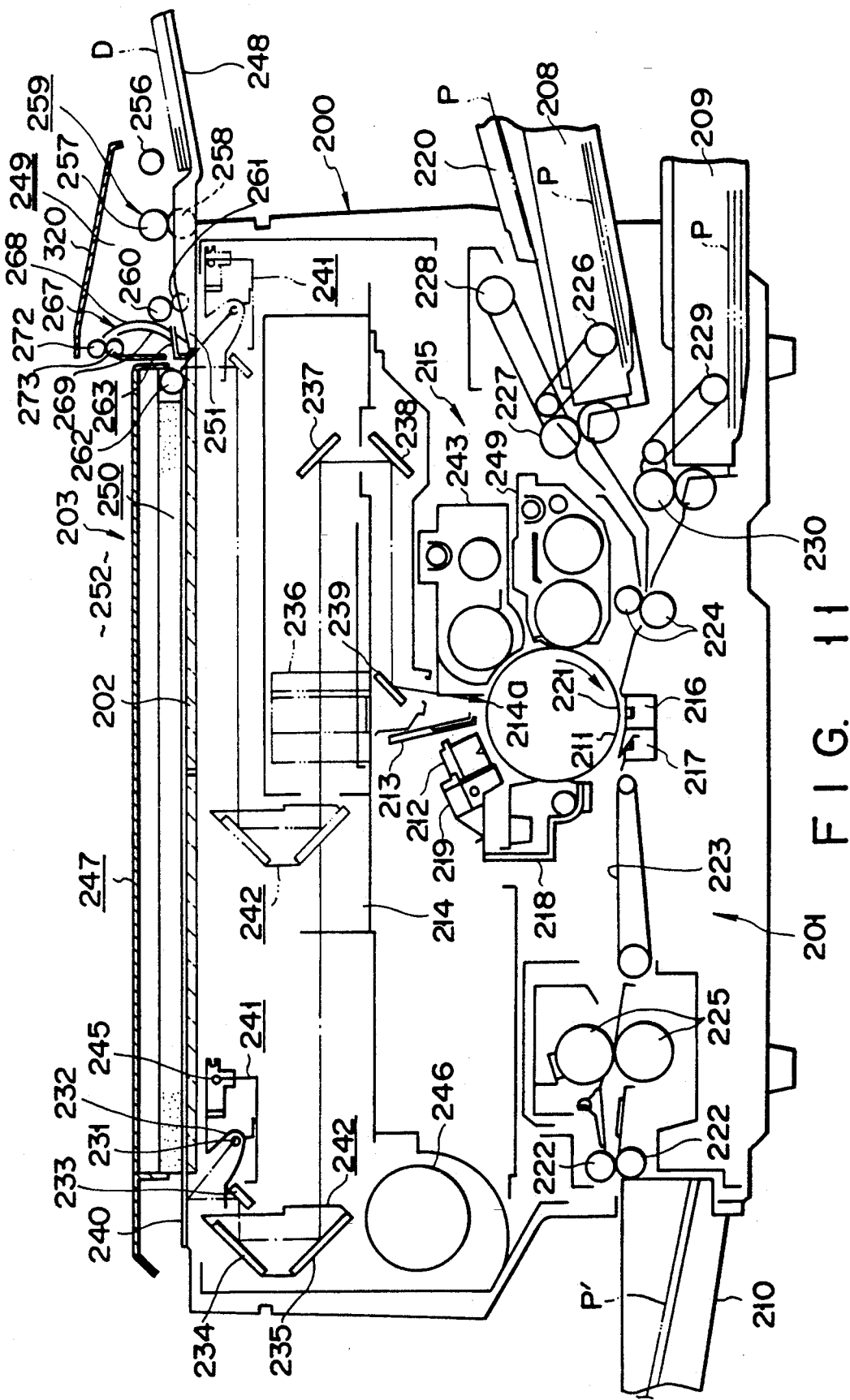
FIG. 11 is a schematic longitudinal sectional view showing the overall arrangement of another embodiment of an image forming apparatus for achieving the second and third objects of the present invention.
Figure 12:
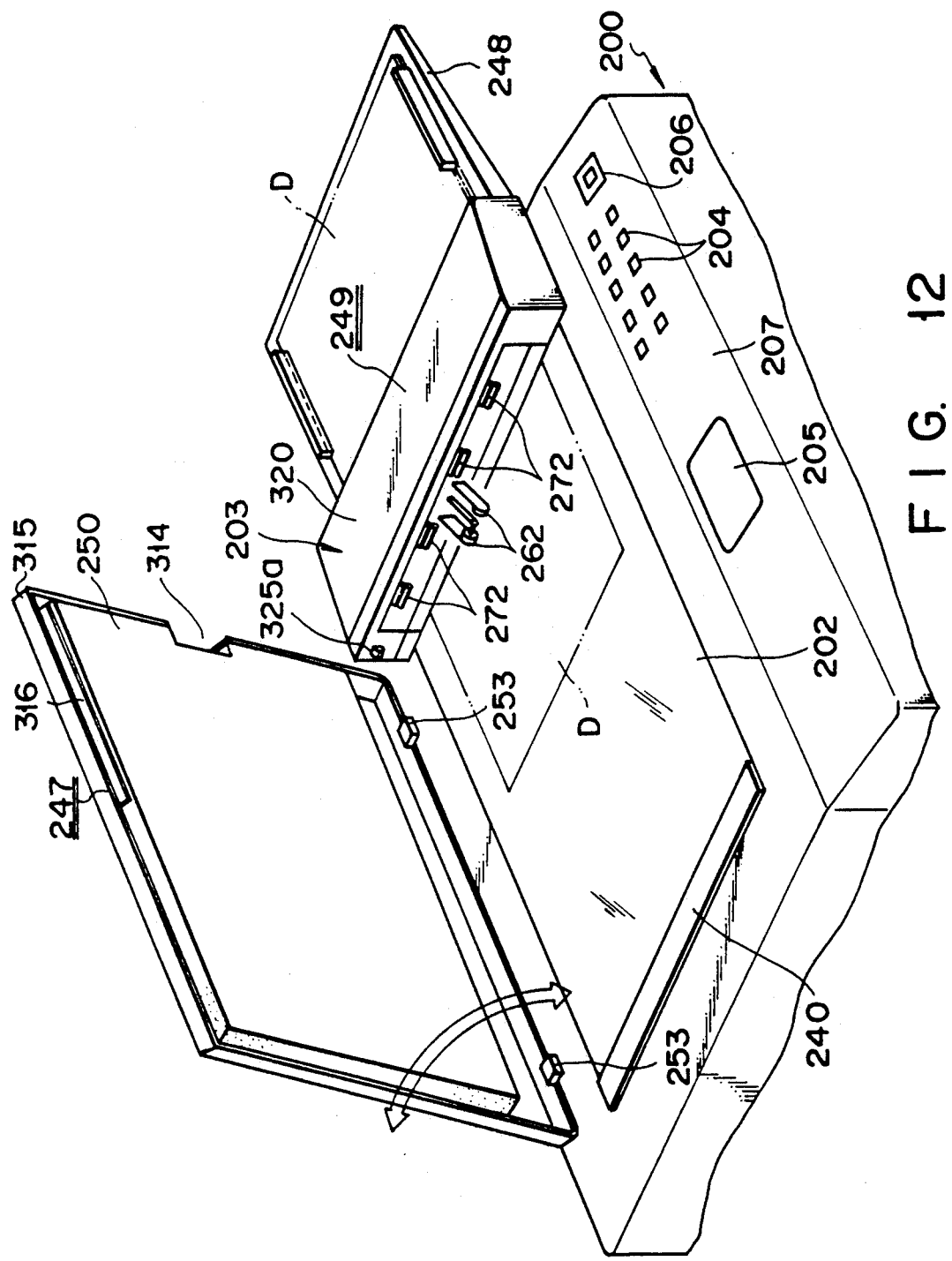
FIG. 12 is a schematic perspective view showing the upper surface of the image forming apparatus shown in FIG. 11 in a state wherein an original cover of the automatic document feeder provided on the upper surface is open.

In FIGS. 11 and 12, a main body 200 includes an image forming means 201 for performing charging, exposure, development, transfer, cleaning, fixing operations, and the like. An automatic document feeder (to be referred to as an ADF hereinafter) 203 for setting an original D on a platen glass 202 as an original table and ejecting the original D from the platen glass 202 is arranged on the upper surface of the main body 200. An operation panel 207 on which a ten-key pad 204, a guide display 205, a copy start key 206, and the like are disposed is arranged on the front edge portion of the upper surface of the main body 200, as shown in FIG. 12.

Upper and lower cassettes 208 and 209 storing different sizes of paper sheets P to be fed to the image forming means 201 are loaded in the right side surface of the main body 200. An ejected sheet tray 210 for stacking paper sheets P' subjected to image formation is loaded in the left side surface of the main body 200.

The image forming means 201 comprises a drum-like photosensitive body 211 as an image carrier arranged at almost the central portion in the main body 200. The image forming means 201 also comprises a charging device 212, an erasing device 213, an exposure unit 214a of an exposure device 214, a developing device 215, a transfer device 216, a sheet separation device 217, a cleaning device 218, and a discharging device 219, which are sequentially arranged around the photosensitive body 211 in its rotational direction.

A paper convey path 223 is formed in the main body 200. The paper convey path 223 guides a paper sheet P, automatically fed from the upper or lower cassette 208 or 209, or a paper sheet P, manually fed through a manual feed table 220 also serving as a cover of the upper cassette 208, toward a pair of eject rollers 222 arranged near the left side surface of the main body 200 via an image transfer unit 221 between the photosensitive body 211 and the transfer device 216.

A pair of aligning rollers 224 are arranged at the upstream side of the image transfer unit 221 along the paper convey path 223, and a fixing device 225 is arranged at the downstream side thereof.

A pickup roller 226, attached to a swingable arm, for picking up paper sheets P one by one from the upper cassette 208 and a separation convey means 227 for receiving the paper sheet P from the pickup roller 226 and feeding it toward the upstream end of the paper convey path 223 are disposed near the loading portion of the upper cassette in the main body 200. The separation convey means 227 comprises a convey roller and a separation roller. A manual feed roller 228 for feeding a paper sheet P manually fed from the manual feed table 220 toward the upstream end of the paper convey path 223 is disposed near the inner edge of the manual feed table 220 in the main body 200.

A pickup roller 229, attached to a swingable arm, for picking up paper sheets P one by one from the lower cassette 209 and a separation convey means 230 for receiving the paper sheet P from the pickup roller 229 and feeding it toward the upstream end of the paper convey path 223 are disposed near the loading portion of the lower cassette in the main body 200. The separation convey means 230 comprises a convey roller and a separation roller.

The exposure device 214 is constituted by an exposure lamp 231, a reflector 232 surrounding a back portion of the exposure lamp 231 to project light from the exposure lamp 231 onto an original D set on the platen glass 202 arranged on the upper surface of the main body 200, a first mirror 233, a second mirror 234, a third mirror 235, a lens 236, a fourth mirror 237, a fifth mirror 238, and a sixth mirror 239. These mirrors and lens sequentially guide light reflected by the original toward the photosensitive body 211. The direction of light emitted from the exposure lamp 231 is slightly inclined by the reflector 232 from a direction perpendicular to the platen glass 202 in a direction of a left scale 246 (to be described in detail later).

The exposure lamp 231, the reflector 232, and the first mirror 233 are mounted on a first carriage 241 which can be reciprocally moved between the left and right ends of the platen glass 202 along the lower surface of the platen glass 202. The second and third mirrors 234 and 235 are mounted on a second carriage 242 which is moved in the same direction as the moving direction of the first carriage 241 at a speed half that of the first carriage 241. These first and second carriages 241 and 242 scan the original D set on the platen glass 202 while they are moved from the left end position indicated by the solid line in FIG. 11 to the right, thus exposing an electrostatic latent image corresponding to an image on the original D on the peripheral surface of the photosensitive body 211.

The developing device 215 comprises an upper developing unit 243 for color development and a lower developing unit 244 for black development. Thus, development by black or another color (e.g., red) can be selected.

A spot light source unit 245 for, when an original D is to be copied while its given region is erased, designating the region is mounted on the first carriage 241. The erasing device 213 erases a charge of a portion, corresponding to the designated region, of an electrostatic latent image formed on the peripheral surface of the photosensitive body 211. A cooling fan 246 is arranged above the fixing device 225 in the main body 200.

An original D up to a maximum of an A3 size (defined by Japanese Industrial Standardization PO138: 297×420 mm) or of Ledger size for a non-domestic use can be set on the platen glass 202.

Note that the charging device 212, the erasing device 213, the exposure device 214, the developing device 215, the transfer device 216, the sheet separation device 217, the cleaning device 218, the discharging device 219, and the fixing device 225 have known arrangements, and a detailed description thereof will be omitted.

As shown in FIGS. 11 and 12 the ADF 203 mainly comprises an original cover (to be referred to as a platen cover hereinafter) 247 for covering the platen glass 202, an original feed tray 248 which extends to the right from the right end portion of the upper surface of the main body 200 and can simultaneously receive a plurality of originals D, and an original feed/eject mechanism 249 arranged between the platen cover 247 and the original feed tray 248 on the upper surface of the main body 200 The original feed/eject mechanism 249 sequentially picks up originals D on the original feed tray 248 one by one to feed the picked-up original into a gap between a platen sheet 250 (to be described in detail later) of the platen cover 247 and the platen glass 202, and sets the original D at a predetermined position on the platen glass 202 with reference to a right scale 251. Upon completion of the exposure operation, the mechanism 249 ejects the original D from the gap between the platen sheet 250 and the platen glass 202 onto an original eject tray 252 provided on the upper surface of the platen cover 247.

As shown in FIG. 12, the rear end portion of the platen cover 247 is attached on the rear end portion of the upper surface of the main body 200 through a pair of hinge members 253, and is openable/closable with respect to the platen glass 202. The pair of hinge members 253 are movable in the vertical direction within a predetermined range with respect to the upper surface of the main body 200. Thus, when a thick original such as a book is to be copied, the platen sheet 250 of the platen cover 247 can be uniformly pressed against the thick original to be parallel to the platen glass 202.

Figure 13:
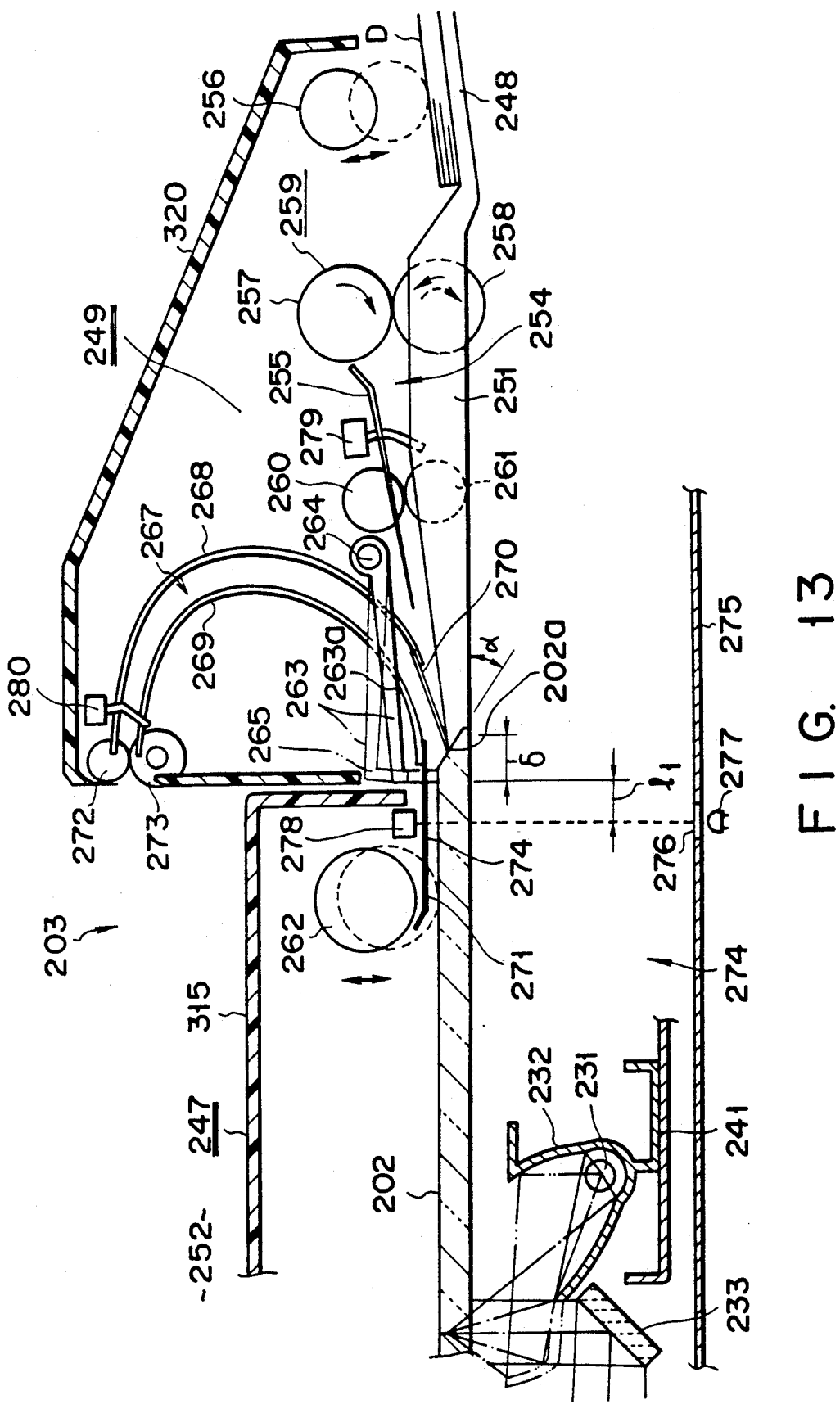
FIG. 13 is a schematic enlarged longitudinal sectional view of an arrangement of an original feed/eject mechanism of the automatic document feeder, in which various original sensing means for controlling an operation of the original feed/eject mechanism are illustrated.
Figure 14:
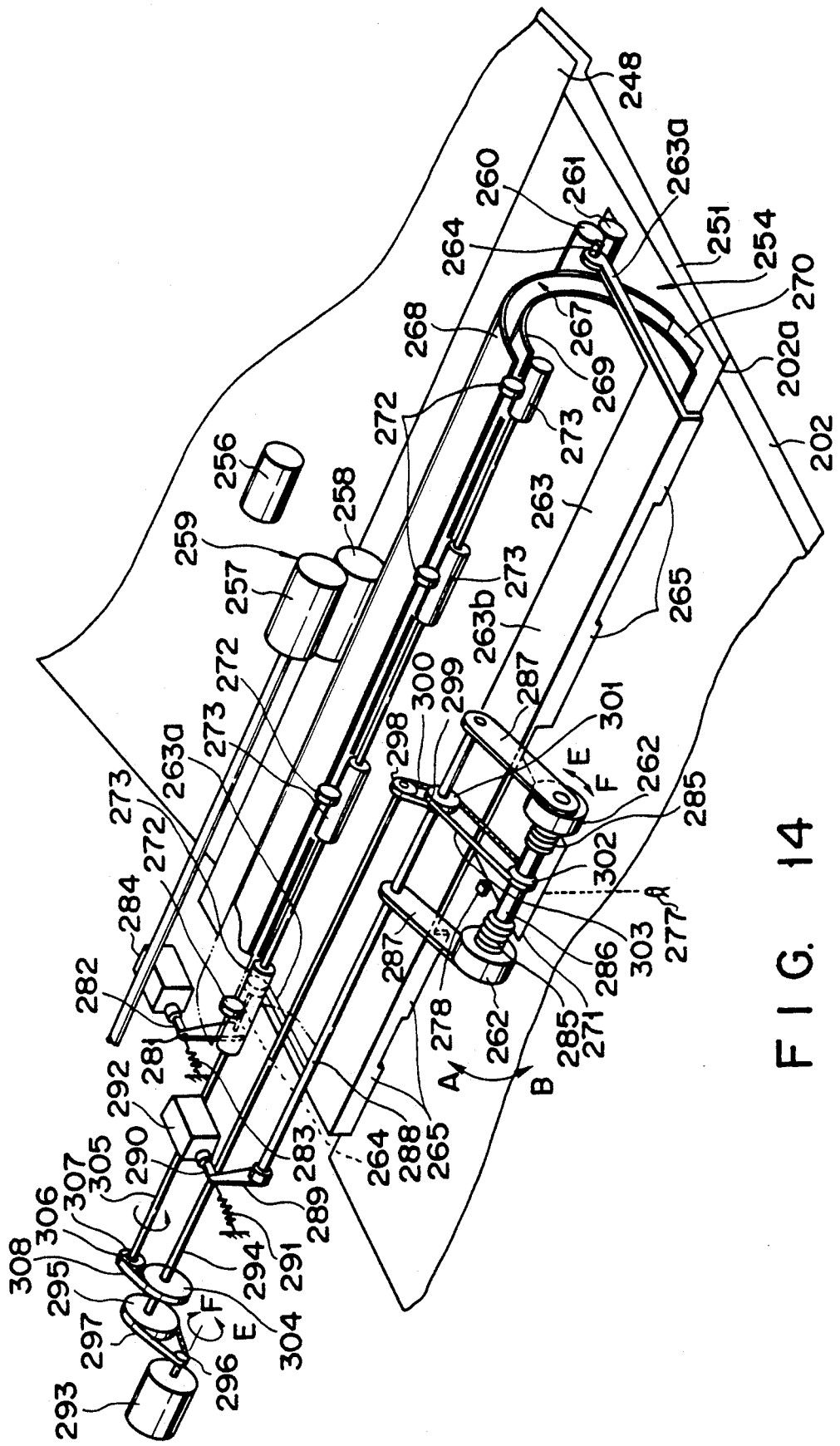
FIG. 14 is a schematic enlarged perspective view of the arrangement of the original feed/eject mechanism of the automatic document feeder, in which various drive mechanisms for the original feed/eject mechanism are illustrated.

FIGS. 13 and 14 show the original feed/eject mechanism 249. The original feed/eject mechanism 249 has an almost horizontal guide member 255 which constitutes a first original convey path 254 extending from the original feed tray 248 to the right end portion of the platen glass 202 in cooperation with the right scale 251. In this embodiment, the right scale 251 is formed integrally with the original feed tray 248. The left end of the right scale 251 is in contact with almost the center of a right end surface 202a of the platen glass 202, which is inclined in an upper right direction.

The original feed/eject mechanism 209 has a pickup roller 256, which is vertically movable with respect to originals D set on the original feed tray 248, for picking up originals D one by one from the original feed tray 248. The pickup roller 256 feeds the original D to a separation/convey means 259. The means 259 is constituted by a feed roller 257 and a separation roller 258 which are vertically in contact with each other. When the pickup roller 256 simultaneously picks up a plurality of originals from the original feed tray 248 to overlap each other, the separation/convey means 259 rotates the separation roller 258 in the reverse direction to feed only the uppermost original into the first original convey path 254. In the first original convey path 254, a pair of registration rollers 260 and 261 are arranged. The registration rollers 260 and 261 set the leading end of an original D which is brought into contact therewith to be parallel to their rotational central axis, and convey it onto the platen glass 202. A pair of feed/eject rollers 262 which can be brought into contact with or separated from the platen glass 202 are arranged near the right end of the upper surface of the platen glass 202. The pair of feed/eject rollers 262 are separated from each other in the back-and-forth direction of the platen glass 202 at substantially the center of the back-and-forth direction to be coaxial with each other, and are selectively rotatable in the forward/reverse direction. Thus, the rollers 262 feed an original D from the registration rollers 260 and 261 onto the platen glass 202, or eject the original D from the platen glass 202.

A stopper member 263 for positioning an original D at the right end portion on the platen glass 202 is arranged between the registration rollers 260 and 261 and the feed/eject rollers 262. The stopper member 263 is constituted by a pair of arms 263a extending along the front and rear edges of the right scale 251 and a beam portion 263b coupling the left end portions (ends near the platen glass 202) of the pair of arms 263a. The stopper member 263 is pivotal about shafts 264 provided to the outer side surfaces of the right end portions (ends far from the platen glass 202) of the pair of arms 263a.

Contact portions 265 projecting downward and with which an original is brought into contact are provided on the beam portion 263b of the stopper member 263. The contact portions 265 are arranged at a position located away from the right end of the platen glass 202 by a distance $\delta$ while being in contact with the platen glass 202.

An inclination angle $\theta$ of the right end surface 202a of the platen glass 202 is set so that the end surface 202a is parallel to light projected from the reflector 232 of the exposure lamp 231 to the platen glass 202 when the exposure lamp 231 is moved to the right end of the platen glass 202.

Therefore, when the right end of the original D is brought into contact with the contact portions 265 of the stopper member 263 at the right end portion on the platen glass 202, the entire original D can be exposed with light obliquely and uniformly projected from the reflector 232 of the exposure lamp 231 onto the platen glass 202 while the exposure lamp 231 is moved to the right end of the platen glass 202. For this reason, since a shadow of the right end portion of the platen glass 202 is not formed on the original D, the entire image on the original D set at the predetermined position of the right end portion on the platen glass 202 by the stopper member 263 can be copied on a paper sheet P by the image forming means 201.

A second convey path 267 for guiding an original D picked up from the platen glass 202 by the feed/eject rollers 262 to an original eject tray 266 constituted by the upper surface of the platen cover 247 is arranged between the feed/eject rollers 262 and the registration rollers 260 and 261 above the right scale 251. The second convey path 267 is constituted by second and third guide members 268 and 269 which extend from positions near the left end portion of the right scale 251 to positions above the original eject tray 266.

One end portion of a sheet member 270 which relates to the principal part of the present invention and is made of, e.g., polyester is arranged at the lower end portion of the second guide member 268. The other end portion of the sheet member 270 extends in a lower left direction toward the left end portion of the upper surface of the right scale 251, and is in contact with the left end portion of the upper surface of the right scale 251. When the original D is conveyed in the first convey path 254 toward the platen glass 202, the sheet member 270 is pushed upward by the leading edge of the original to allow arrival of the original D onto the platen glass 202. When the original D is picked up from the platen glass 202 by the feed/eject rollers 262, the free end portion (left end portion) of the sheet member 270 is pressed against the upper surface of the right scale 251 by the original D to guide the original D into the second convey path 267.

Although the sheet member 270 has a simple arrangement, it can reliably operate as a gate mechanism for allowing entrance of the original D from the first convey path 254 onto the platen glass 202 near the right end of the platen glass 202 and guiding the original D from the platen glass 202 to the second convey path 267.

The proximal end portion of a fourth guide member 271 which extends above the right end portion of the upper surface of the platen glass 202 between the pair of feed/eject rollers 262 is attached to the lower end portion of the third guide member 269.

A pair of eject rollers 272 and 273 for forcibly ejecting an original D which enters the second convey path 267 onto the original eject tray 252 on the platen cover 247 are provided to the upper end portions of the second and third guide members 268 and 269.

An opening 274 is formed in a region of the fourth guide member 271 located between the feed/eject rollers 262 and the contact portion 265 of the stopper member 263. An opening 276 is formed in a partition frame 275 for partitioning the interior of the apparatus main body 200 to define a travel path 274 of the first carriage 241. The opening 276 opposes the opening 274 of the fourth guide member 271. These openings 274 and 276 are utilized by a sensor constituting, e.g., a photointerrupter for sensing the trailing end of the original which is conveyed from the first convey path 254 to the right end portion of the upper surface of the platen glass 202. The sensor is constituted by a light emitting element 277 arranged immediately below the opening 276 in the partition frame 275 of the apparatus main body 200 and a photo sensor 278 arranged immediately above the opening 27 of the fourth guide member 271. The light emitting element 277 and the photo sensor 278 are arranged at positions respectively located away from the contact portion 265 of the stopper member 263 by a distance $l_1$ in the horizontal direction.

A switch lever of an original sensing switch 279 projects in the first convey path 254. A switch lever of an original sensing switch 280 projects at a position near the exit of the second convey path 267.

FIG. 14 is an enlarged view of an arrangement near the stopper member 263.

One of the shafts 264 at the proximal end portions of the pair of arms 263a of the stopper member 263 is coupled to a plunger 282 through a link member 281. The plunger 282 is urged in one direction by a spring 283, and projects from or is retracted in a solenoid 284 upon energization/deenergization of the solenoid 284. Therefore, when the solenoid 284 is energized/deenergized, the stopper member 263 is pivoted in directions of arrows A and B in FIG. 14 through the plunger 282 and the link member 281 to cause the contact portions 265 to be in contact with or separated from the upper surface of the platen glass 202.

The pair of feed/eject rollers 262 are attached to a short horizontal shaft 286 through spring clutches 285. The two ends of the horizontal shaft 286 are supported by one end portions of a pair of support arms 287. The other end portions of these support arms 287 are attached to one end portion of a long horizontal shaft 288. The other end portion of the long horizontal shaft 288 extends to the rear end portion of the upper surface of the apparatus main body 200 and is coupled to a plunger 290 through a link member 289. The plunger 290 is urged in one direction by a spring 291, and projects from or is retracted in a solenoid 292 upon energization/deenergization of the solenoid 292. Therefore, when the solenoid 292 is energized/deenergized, the pair of support arms 287 and the pair of feed/eject rollers 262 are integrally pivoted in directions of arrows A and B in FIG. 14, and the pair of feed/eject rollers 262 are brought into contact with or separated from the upper surface of the platen glass 202.

The pair of feed/eject rollers 262 and the pair of eject rollers 272 and 273 at the exit of the second convey path 267 are driven by a common motor 293.

More specifically, a power transmission shaft 294 extends along the long horizontal shaft 288 for the pair of feed/eject rollers 262. A pulley 295 is attached to the rear end of the power transmission shaft 294. A power transmission belt 297 is looped between the pulley 295 and the output shaft of the motor 293. A pulley 298 is attached to the front end of the power transmission shaft 294. A power transmission belt 300 is looped between the pulley 298 and a pulley 299 which is rotatably mounted on the front end portion of the long horizontal shaft 288 between the pair of support arms 287. A pulley 301 which is formed adjacent to and integrally with the pulley 299 is rotatably provided to the long horizontal shaft 288. A power transmission belt 303 is looped between the pulley 301 and a pulley 302 attached to the short horizontal shaft 286 for the pair of feed/eject rollers 262 between the rollers 262.

Another pulley 304 is provided to the rear end portion of the power transmission shaft 294. A pulley 307 is provided to the rear end portion of a rotational center shaft 305 of one of the pair of eject rollers 273 through a one-way clutch 306. A power transmission belt 308 is looped between these pulleys 304 and 307. The one-way clutch 306 is locked when the output shaft of the motor 293 is rotated in a direction of an arrow E in FIG. 14 (counterclockwise), and is free when it is rotated in a direction of an arrow F (clockwise).

Therefore, in a state wherein the pair of support arms 287 are rotated in the direction of the arrow B so as to urge the feed/eject rollers 262 against the platen glass 202, when the output shaft of the motor 293 is rotated in the direction of the arrow F in FIG. 14 (clockwise), the eject rollers 272 and 273 at the exit of the second convey path 267 are not rotated, and only the feed/eject rollers 262 are rotated in the direction of the arrow F in FIG. 14. Thus, the feed/eject rollers 262 feed the original D which is conveyed from the original feed tray 248 along the first convey path 254 onto the platen glass 202.

In the above-mentioned state, when the output shaft of the motor 293 is rotated in the direction of the arrow E in FIG. 14 (counterclockwise), the feed/eject rollers 262 and the eject rollers 272 and 273 are simultaneously rotated in the direction of the arrow E in FIG. 14 (counterclockwise). Thus, the original D which is set at the predetermined position of the right end portion of the upper surface of the platen glass 202 to be in contact with the contact portion 265 of the stopper member 263, as will be described in detail later, is fed into the second path 267, and is ejected onto the original eject tray 252.

FIG. 15 shows the arrangement of the feed/eject rollers 262 in more detail.

The feed/eject rollers 262 are rotatably supported through rotary members 309, on the short horizontal shaft 286, the two ends of which are supported by the pair of support arms 287. Each rotary member 309 has an annular coupling portion 309a projecting sideway along the short horizontal shaft 286. An annular stationary member 310 is provided on the shaft 286 to be adjacent to the coupling portion 309a of each rotary member 309. The stationary member 310 is fixed to the short horizontal shaft 286 by a pin 311 to be non-rotatable. The stationary member 310 and the coupling portion 309a of the rotary member 309 have the same diameter. The coupling portion 309a and the stationary member 310 are coupled by the spring clutch 285 wound around these members. When the short horizontal shaft 286 is rotated in the direction of the arrow A (clockwise) shown in FIG. 14, the spring clutch 285 locks the stationary member 310 and the rotary member 309. When the short horizontal shaft 286 is rotated in the direction of the arrow B (counterclockwise) in FIG. 14, the spring clutch 285 causes the rotary member 309 to slip relative to the stationary member 310 at a predetermined frictional force. This frictional force is set to be smaller than a frictional force generated between the original D and the feed/eject rollers 262 when the original D is stopped on the platen glass 202.

Therefore, when the feed/eject rollers 262 are rotated in the direction of the arrow E (counterclockwise) in order to set the original D introduced from the first convey path 254 onto the platen glass 202 at the predetermined position of the right end portion of the upper surface of the platen glass 202, the right end of the original D is brought into contact with the contact portion 265 of the stopper member 263, and the feed/eject rollers 262 slip on the short horizontal shaft 286 and stop their rotation. Thus, even if the feed/eject rollers 262 are formed of a material having a high coefficient of friction in order to prevent a slip on the original D, the original D will not be urged against the contact portion 265 of the stopper member 263 until it is bent.

Figure 17:
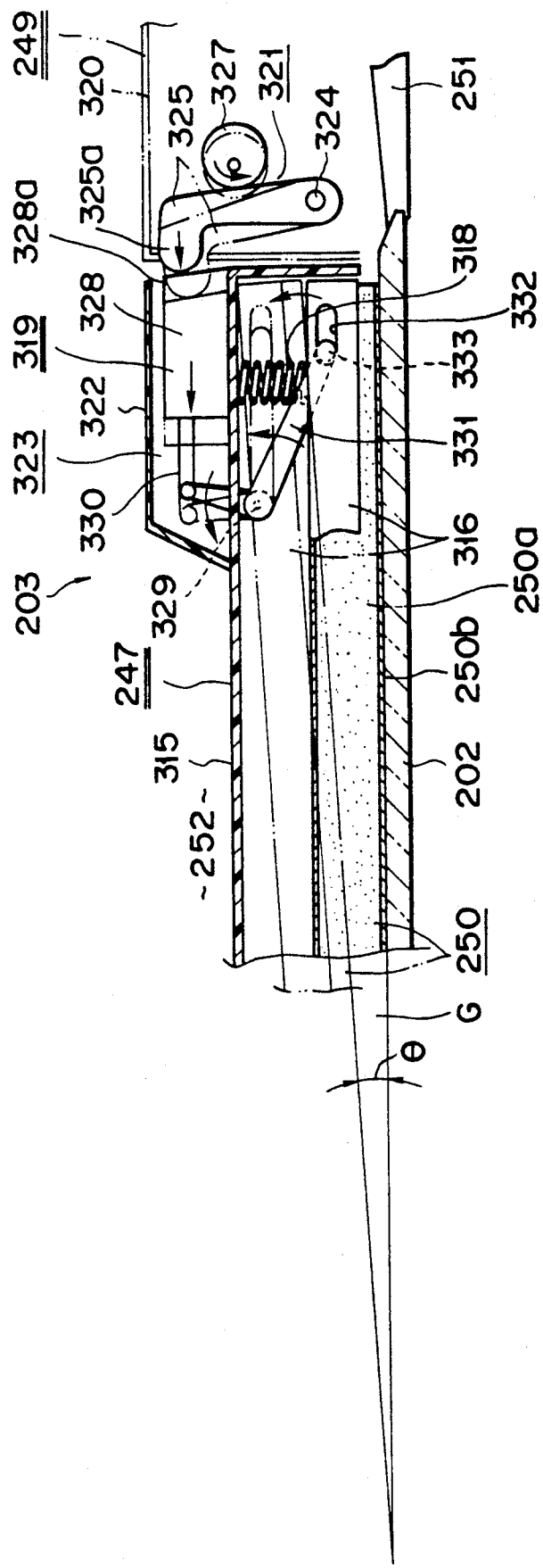
FIG. 17 is a schematic enlarged sectional view showing in detail the arrangement of the gap forming means.

FIGS. 16 and 17 schematically show the structure of the platen cover 247. The platen sheet 250 of the platen cover 247 has substantially the same planar dimensions as those of the platen glass 202. The platen sheet 250 is constituted by an elastic member 250a of urethane or the like, and a white sheet 250b having a low coefficient of friction and adhered to the lower surface of the elastic member 250a. A notch 314 which receives the feed/eject rollers 262 is formed at the center of the right end of the platen sheet 250 (FIG. 12).

The platen sheet 250 is covered with a cover main body 315 excluding its lower surface. The cover main body 315 is attached on the rear end portion of the upper surface of the main body 200 through the pair of hinge members 253 (FIG. 13). The left half portion of the platen sheet 250 is directly fixed to the left half portion of the inner recess of the cover main body 315, and its right half portion is adhered to a movable frame 316 pivotally mounted on the right half portion of the inner recess of the cover main body 315.

The movable frame 316 is supported on the cover main body 315 by pivot supports 317 (only the front one is illustrated) at substantially the center of the cover main body 315 in its right-and-left direction. Compression springs 318 as urging means are disposed between the free end portion (right end portion) of the upper surface of the movable frame 316 and the bottom surface of the recess of the cover main body 315. The compression springs 318 always urge the free end portion of the movable frame 316 downward, as indicated by a solid line in FIG. 17, to bring the entire platen sheet 250 into tight contact with the platen glass 202. In this state, the movable frame 316 is in a horizontal state.

Figure 18:
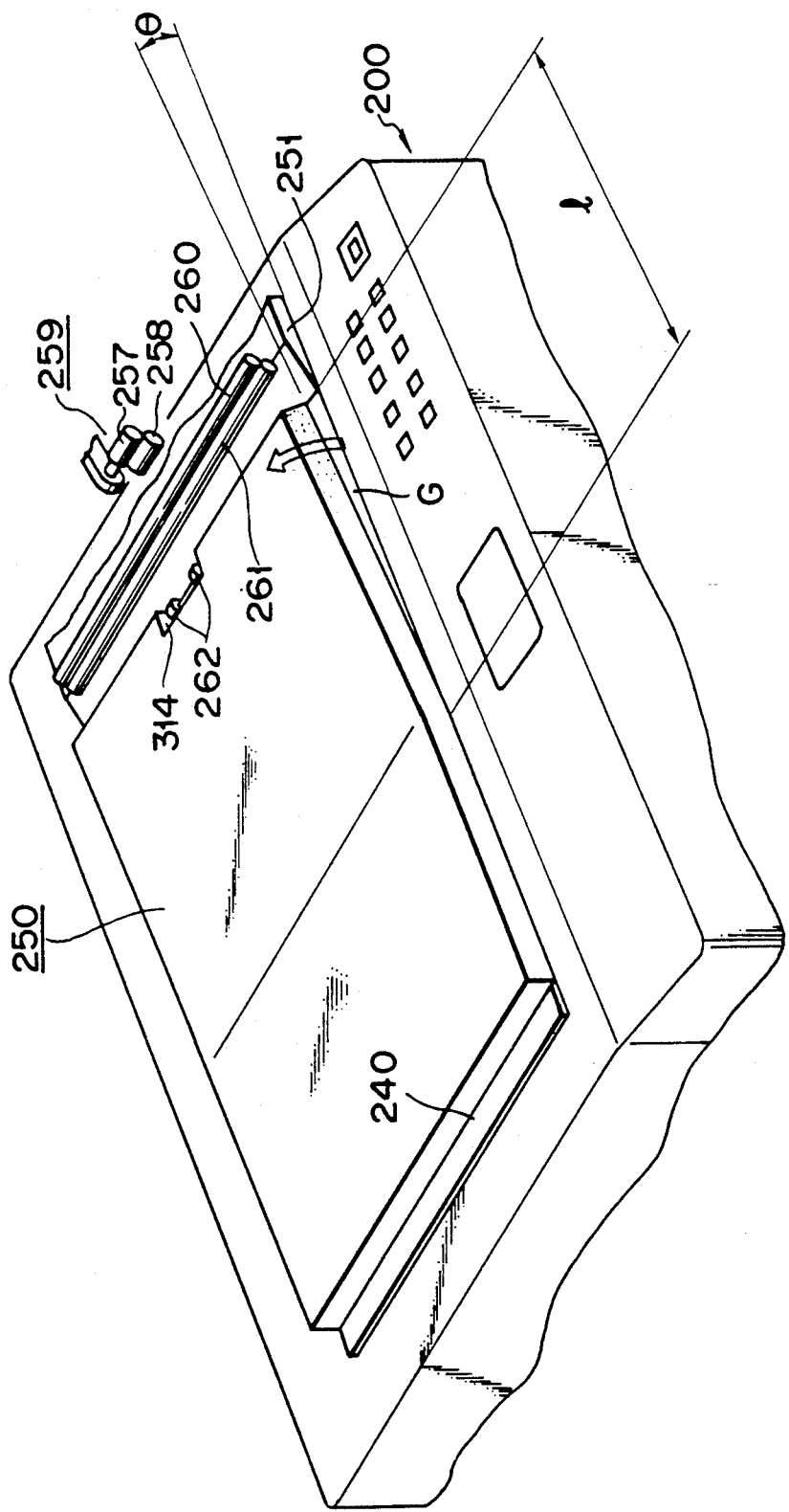
FIG. 18 is a schematic perspective view of the platen sheet in a state wherein a wedge-shaped gap is formed between the platen sheet and the right half portion of the original table (platen glass) on the upper surface of the image forming apparatus shown in FIG. 11, by the gap forming means on the upper surface of this apparatus.

The movable frame 316 can be provided upward by a predetermined angle against the urging forces of the compression springs 318 by a gap forming means 319 (to be described later). In FIG. 17, the movable frame 316 pivoted to an upward position is illustrated by a two-dot chain line. In this state, a gap G having an angle $\theta$ and a length l is formed under the right half portion of the lower surface of the platen sheet 250, as shown in FIGS. 17 and 18.

As shown in FIGS. 16 and 17, the gap forming means 319 comprises a drive mechanism 321 arranged in a cover 320 covering the original feed/eject mechanism 249, and a power transmission mechanism 323, arranged in a cover 322 attached to the right end portion of the platen cover 247, for transmitting a force generated by the drive mechanism 321 to the movable frame 316.

The drive mechanism 321 is constituted by an inverted L-shaped pusher 325 which is pivotal about a shaft 324 as a fulcrum, and an eccentric cam roller 327 using a motor 326 as a drive source. Since the pusher 325 is urged by urging means (not shown) to be kept in contact with the peripheral surface of the eccentric cam roller 327, rotation of the eccentric cam roller 327 causes swing movement of the pusher 325, and a side projecting portion 325a of the pusher 325 projects from or is retracted in an opening formed in the left end surface of the cover 320.

The power transmission mechanism 323 has a slider 328, one end surface 328a of which opposes the side projecting portion 325a of the pusher 325. The slider 328 is reciprocal in the moving direction of the side projecting portion 325a of the pusher 325. The other end face of the slider 328 is coupled, through a link mechanism 330, to one end of a shaft 329 which is rotatably supported in a space between the bottom surface of the recess of the cover main body 315 and the upper surface of the movable frame 316. Pivot levers 331, extending toward the free end portions of the two side walls of the movable frame 316, are fixed on the two ends of the shaft 329. The extending ends of the pivot levers 331 support guide rollers 333 engaged with horizontal guide grooves 332 formed in the free end portions at the two side walls of the movable frame 316. In the power transmission mechanism 323, the sliding movement of the slider 328 is converted to rotation of the shaft 329 by the link mechanism 330. The shaft 329 pivots the pair of pivot levers 331 within a predetermined angular range.

In the gap forming means 319, in a still state, a minimum eccentric position on the peripheral surface of the eccentric cam roller 327 is in contact with the right end face of the upward extending portion of the pusher 325, as indicated by a solid line in FIG. 17. The side projecting portion 325a of the pusher 325 is retracted in the cover 320 for the original feed/eject mechanism 249. Therefore, since the side projecting portion 325a of the pusher 325 does not push one end face 328a of the slider 328, the movable frame 316 is urged by the compression springs 318 so that the entire surface of the platen sheet 250 is brought into tight contact with the platen glass 202. In this state, the movable frame 316 is in a horizontal state.

When an original D is fed onto or ejected from the platen glass 202, the output shaft of the motor 326 is driven to rotate the eccentric cam roller 327 by 180° in response to a signal from a control unit (not shown). As a result, as indicated by a two-dot chain line in FIG. 17, a maximum eccentric position on the peripheral surface of the eccentric cam roller 327 is brought into contact with the right end surface of the pusher 325. For this reason, the pusher 325 is pivoted so that its side projecting portion 325a projects from the opening in the left end surface of the cover 320. The slider 328 is then pushed by the side projecting portion 325a of the pusher 325 and is slid to the left in the cover 322 for the power transmission mechanism 323. This movement of the slider 328 causes counterclockwise pivotal movement of the pivot levers 331. As a result, the movable frame 316 is pivoted counterclockwise about the pivot supports 317 so that its free end portion is pushed up against the urging forces of the compression springs 318. The right half portion of the platen sheet 250 is separated upward from the platen glass 202, and the gap G having the angle $\theta$ and the length l is formed below the right half portion of the lower surface of the platen sheet 250, as indicated by a solid line in FIG. 18 and a two-dot chain line in FIG. 17.

Figure 19:
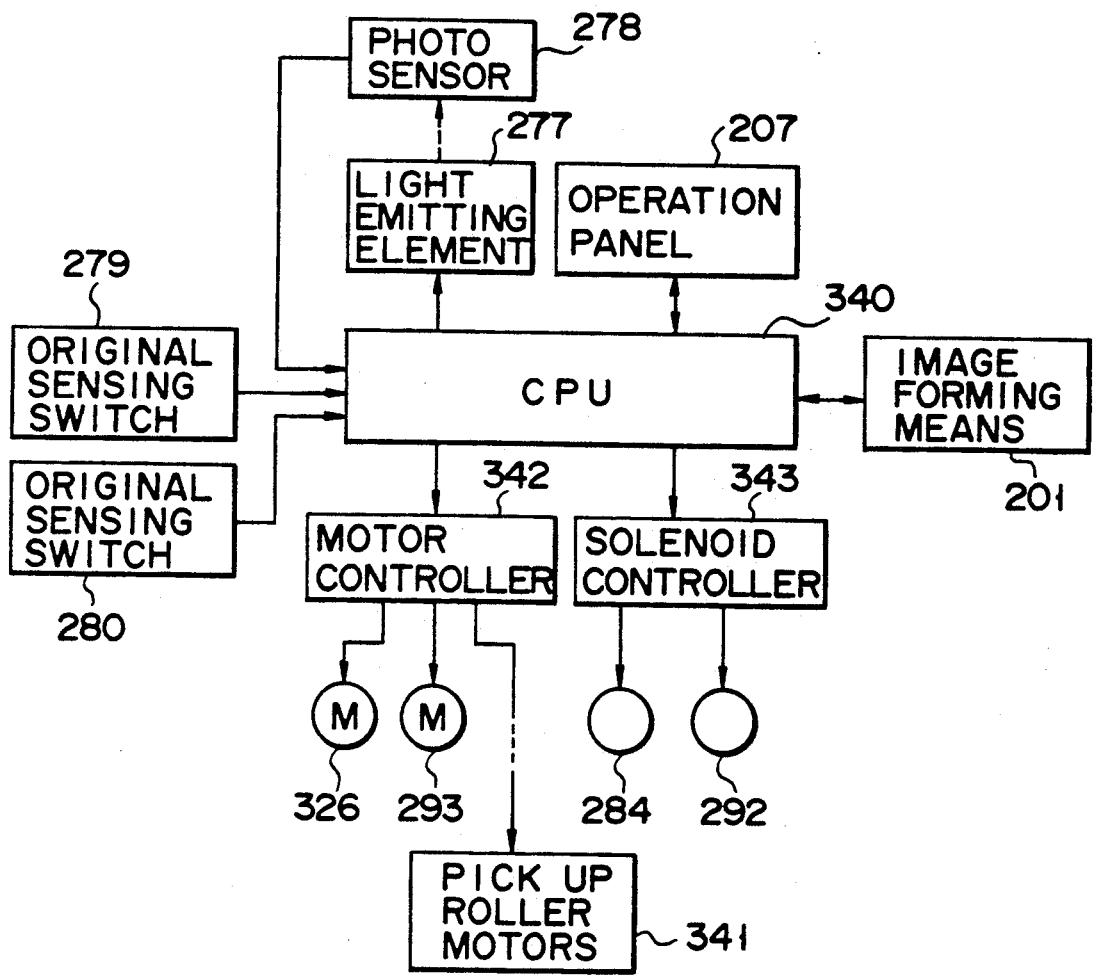
FIG. 19 is a schematic block diagram of a control means for the automatic document feeder in the image forming apparatus shown in FIG. 11.

FIG. 19 schematically shows the arrangement of a control system. A control processing unit (CPU) 340 controls the overall apparatus main body 200. The CPU 340 is connected to the operation panel 207, the image forming means 201, a motor controller 341, a solenoid controller 342, the original sensing switches 279 and 280, a combination of the light emitting element 277 and the photo sensor 278, and pickup roller motors 341 for the pickup rollers 228, 226, and 229 for the manual feed table 220 and the upper and lower cassettes 208 and 209. The CPU 340 causes the motor controller 342 and the solenoid controller 343 to control the motors 326 and 293 and the solenoids 284 and 292 in accordance with an instruction from the operation panel 207, so that a plurality of originals on the original feed tray 248 are fed one by one to the predetermined position on the platen glass 202 and are ejected therefrom onto the original eject tray 266. In addition, the CPU 340 causes the pickup roller motors 341 to feed desired paper sheets P one by one to the image forming means 201, and controls the exposure lamp 231, the photosensitive body 211, and the like constituting the image forming means 201 to copy an image on the original D at the predetermined position on the platen glass 202 onto a paper sheet P.

A feed operation of an original D from the original feed tray 248 to the predetermined position of the right end portion of the upper surface of the platen glass 202 and an eject operation of the original D from the predetermined position to the original eject tray 266 by the ADF 203 will be described below with reference to FIG. 14, FIGS. 20a to 20j, and FIGS. 21a and 21b.

In a standby state of the ADF 203, the solenoid 284 (FIG. 14) for the stopper member 263 is deenergized. As a result, as shown in FIG. 20a, the contact portion 265 of the stopper member 263 is in contact with the platen glass 202. The solenoid 292 (FIG. 14) for the feed/eject rollers 262 is energized. As a result, the feed/eject rollers 262 are separated from the platen glass 202 (step ST1 in FIG. 21a). The motor 326 for the gap forming means 319 and the motor 293 for the feed/eject rollers 262 are stopped. As a result, the entire lower surface of the platen sheet 250 is in contact with the platen glass 202, and the feed/eject rollers 262 are stopped (step ST2 in FIG. 21a).

Figure 21A:
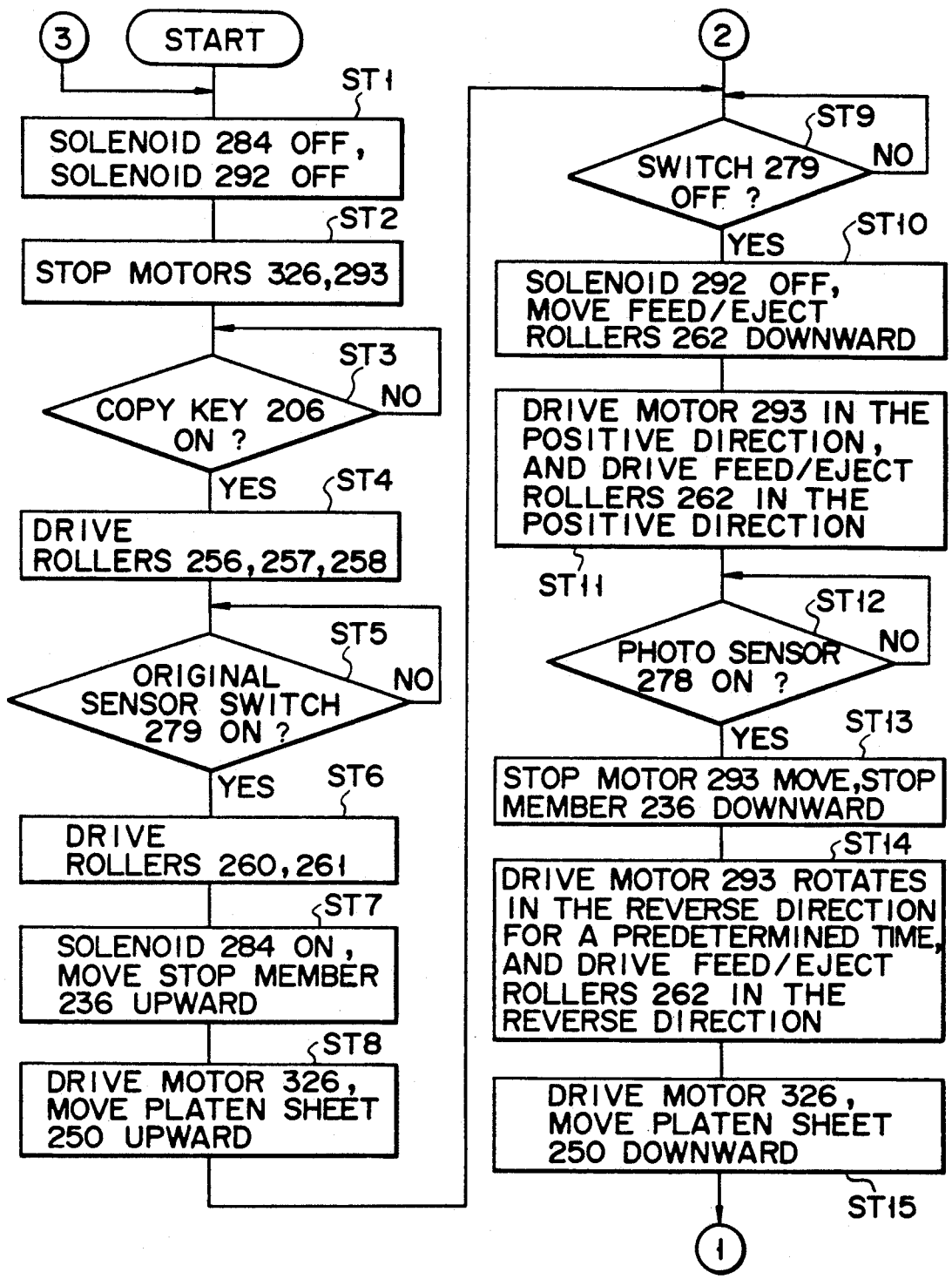
FIGS. 21a and 21b are schematic flow charts of the operation flow of the image forming apparatus shown in FIG. 11.

Assume that a plurality of originals D are set on the original feed tray 248 with image surfaces facing down, and the copy start key 206 (FIG. 12) is depressed (step ST3 in FIG. 21a). The pickup roller 256 for the original feed tray 248 is moved downward and is brought into contact with the uppermost original D of the bundle of originals D on the original feed tray 248. The pickup roller 256, the feed roller 257, and the separation roller 258 are then rotated to pick up the uppermost original D1 from the original feed tray 248 (step ST4 in FIG. 21a). The leading end of the original D1 abuts against the registration rollers 260 and 261 in a stopped state to be registered. When the original sensing switch 279 immediately before the registration rollers 260 and 261 detects the original D1 (step ST5 in FIG. 21a), the registration rollers 260 and 261 are rotated to convey the original D1 to the left toward the exit of the first convey path 254 (step ST6 in FIG. 21a).

In this case, the solenoid 284 for the stopper member 263 is energized, and the stopper member 263 is pivoted so that the contact portion 265 is separated from the platen glass 202, as shown in FIG. 20b (step ST7 in FIG. 21a). The motor 326 for the platen sheet 250 is driven so that the pusher 325 pushes the slider 328, as indicated by a two-dot chain line in FIG. 17, thus forming the gap G between the right half portion of the lower surface of the platen sheet 250 and the right half portion of the platen glass 202 (step ST8 in FIG. 21a). The original D1 moving to the left is conveyed into the gap G on the platen glass 202 while pushing away the sheet member 270 at the entrance of the second convey path 267.

Figure 20C:
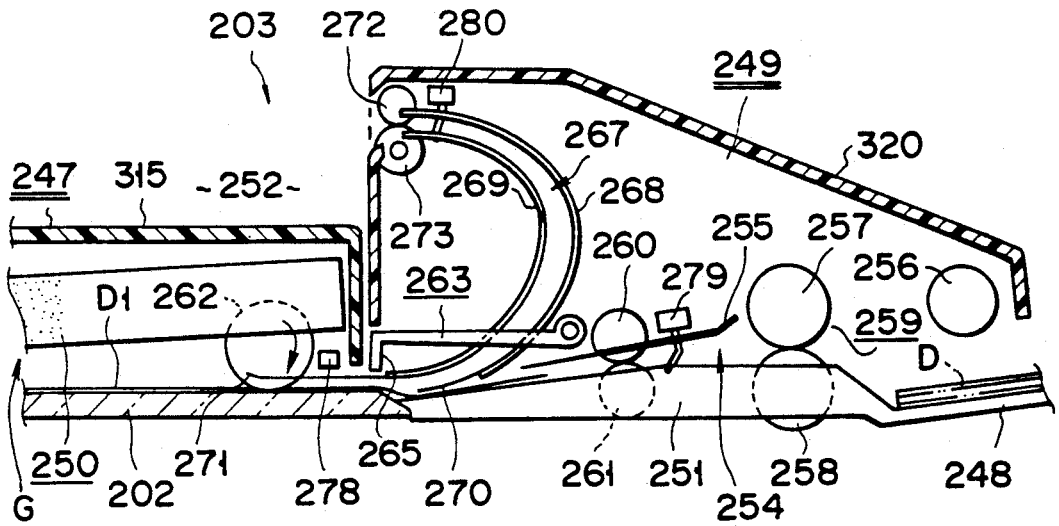
Figure 20D:
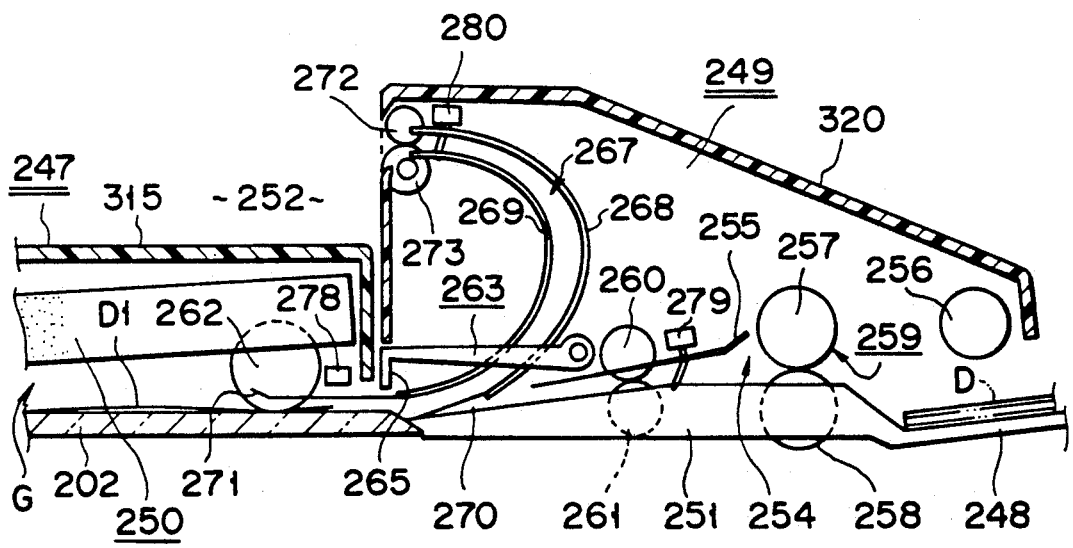

When the trailing end (right end in FIG. 20b) is detected by the original sensing switch 279 of the first convey path 254 (step ST9 in FIG. 21b), the solenoid 292 for the feed/eject rollers 262 is deenergized so that the feed/eject rollers 262 are brought into contact with the platen glass 202, as shown in FIG. 20c (step ST10 in FIG. 21a). Since the output shaft of the motor 293 for the feed/eject rollers 262 is rotated in the forward direction (F direction in FIG. 14), the original D1 is conveyed on the right half portion of the platen glass 202 by the feed/eject rollers 262 (step ST11 in FIG. 21a). In this case, even if the length of the conveyed original D1 is larger than the length l of the gap G, since the platen glass 202 and the white sheet 250b (FIG. 17) on the lower surface of the platen sheet 250 are low-friction members, the leading end (left end) of the original D1 can smoothly enter a slit between the platen sheet 313 and the platen glass 202 due to its elasticity without being bent.

Figure 20E:
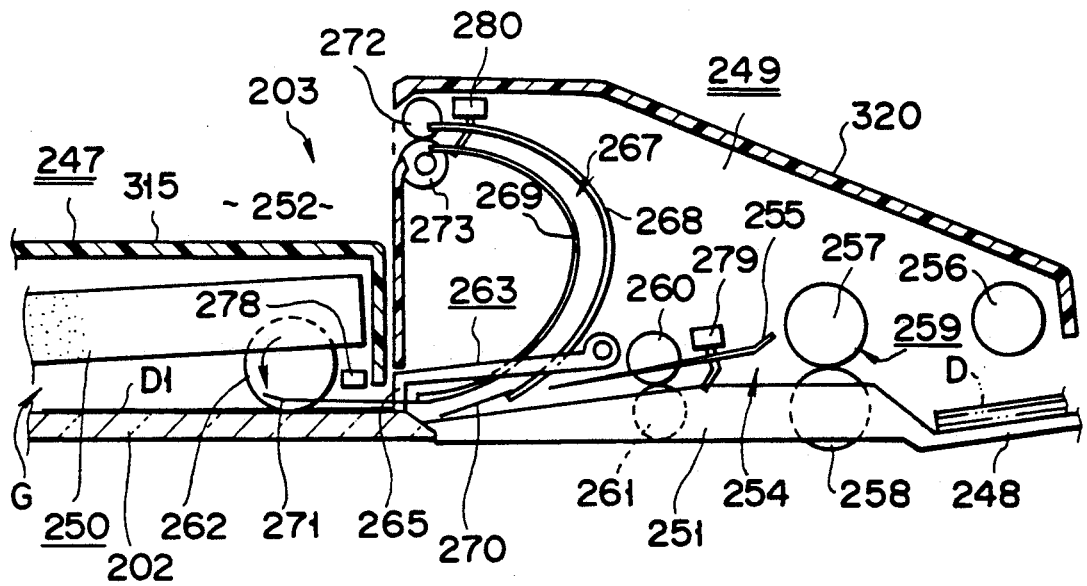

When the trailing end of the original D1 is detected by the photo sensor 278 at the right end portion of the platen glass 202 (step ST12 in FIG. 21a), the solenoid 284 for the stopper member 263 is deenergized, and the stopper member 263 is rotated so that the contact member 265 is brought into contact with the platen glass 202 (step ST13 in FIG. 21a). Thereafter, the output shaft of the motor 293 for the feed/eject rollers 262 is rotated in the reverse direction (E direction in FIG. 14), and the original D1 is conveyed to the right on the right end portion of the upper surface of the platen glass 202 by the feed/eject rollers 262 which are rotated in the reverse direction. When the right end of the original D1 abuts against the contact portion 265 of the stopper member 263, as shown in FIG. 20e, the reverse rotation of the feed/eject rollers 262 is stopped (step ST14 in FIG. 21a).

Figure 20F:
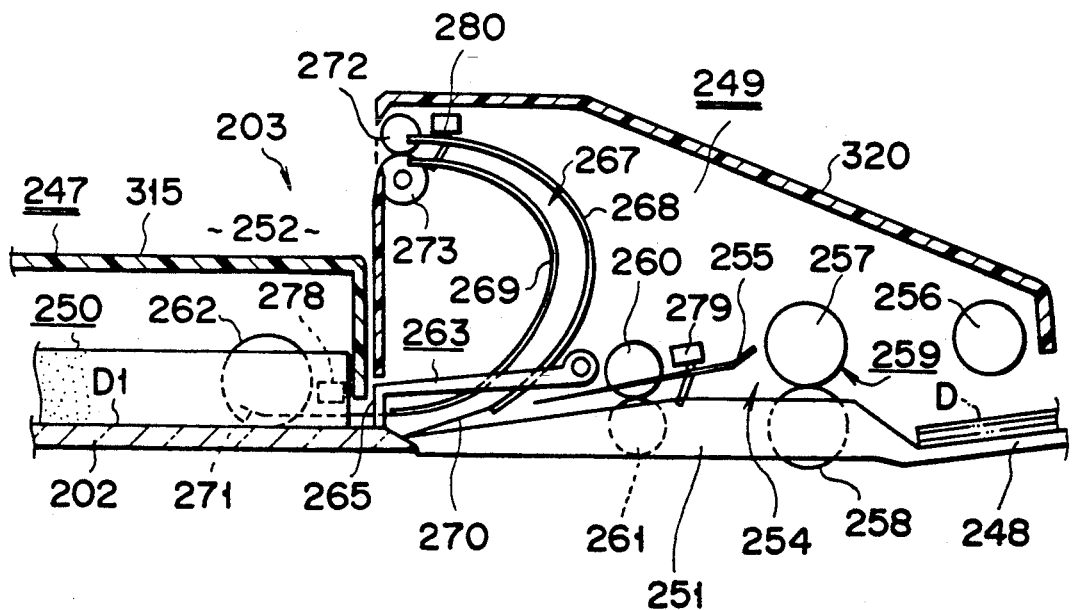

Thereafter, the motor 326 for the platen sheet 250 is driven to cancel the pushing of the slider 328 by the pusher 325. Therefore, the movable frame 316 which supports the right half portion of the platen sheet 250 is pivoted to a horizontal state indicated by a solid line in FIG. 17 due to restoration forces of the compression springs 318, and the right half portion of the platen sheet 250 presses the original D1 against the platen glass 202, as shown in FIG. 20f (step ST15 in FIG. 21a).

Figure 21B:
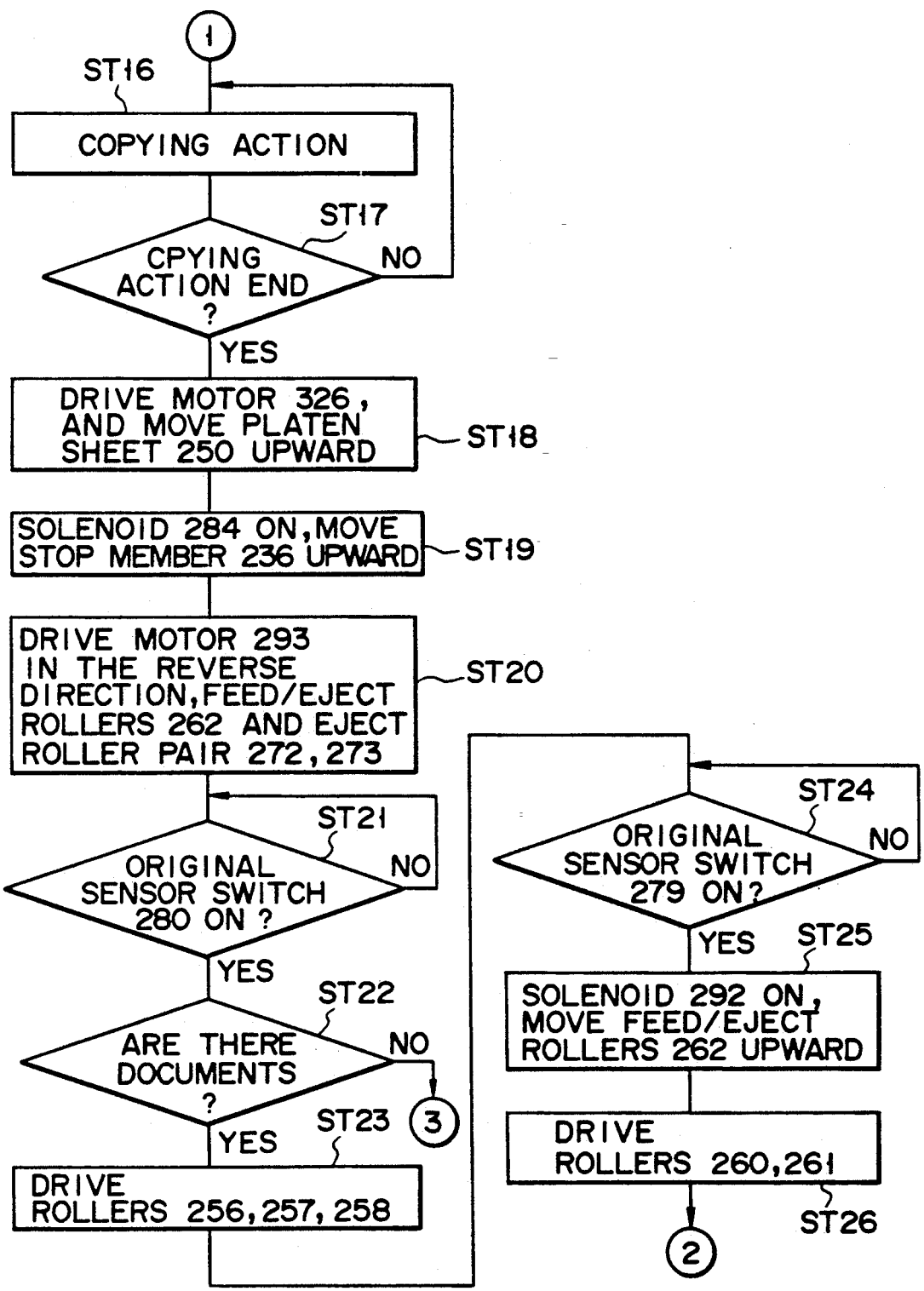

When setting of the original D1 at the predetermined position of the right half portion of the upper surface of the platen glass 202 is completed in this manner, the original D1 is scanned by the exposure device 214 (FIG. 11) in the apparatus main body 200, and an image on the original D1 is copied on a paper sheet P picked up from one of the manual feed table 220 and the upper and lower cassettes 208 and 209 using the developing device 215, the transfer device 216, the paper separation device 217, the cleaning device 218, the discharging device 219, the fixing device 225, and the like (step ST16 in FIG. 21b).

Figure 20G:
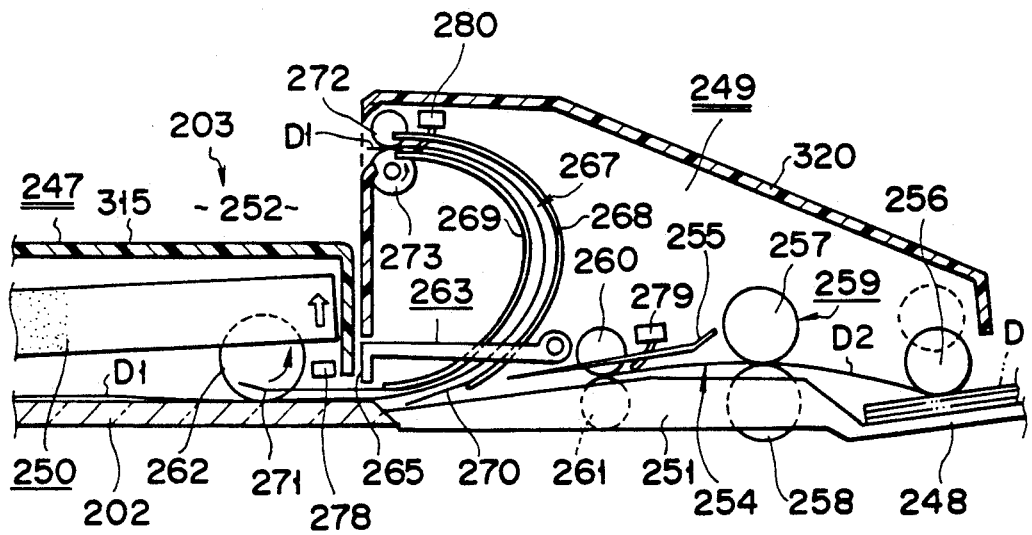

Upon completion of the copying operation (step ST17 in FIG. 21b), the motor 326 for the platen sheet 250 is driven to pivot the movable frame 316 upward against the urging forces of the compression springs 318 and to form the gap G between the right half portion of the platen sheet 250 and the right half portion of the platen glass 202. The solenoid 284 for the stopper member 263 is energized so that the contact portions 265 of the stopper member 263 are separated from the platen glass 202, as shown in FIG. 20g (step ST18 in FIG. 21b). The output shaft of the motor 293 for the feed/eject rollers 262 is rotated in the reverse direction (E direction in FIG. 14), and the original D1 is conveyed to the right from the predetermined position of the right half portion on the platen glass 202. The original D1 collides against the sheet member 270 at the entrance of the second convey path 267 to be guided into the second convey path 267, and is then ejected by the eject rollers 272 and 273 at the exit of the second convey path 267 onto the original eject tray 266 on the upper surface of the main body 315 of the platen cover 297 (step ST20 in FIG. 21b).

Figure 20H:
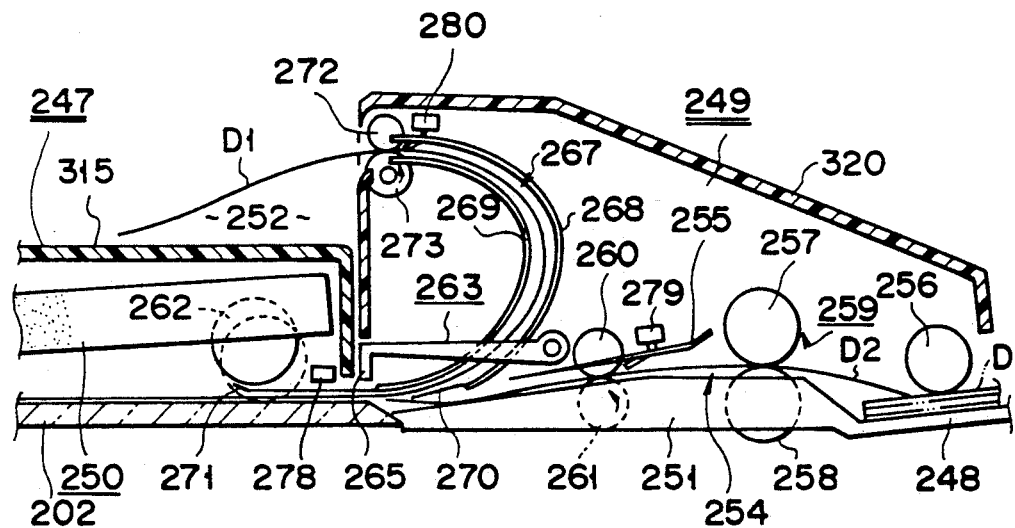
Figure 20I:
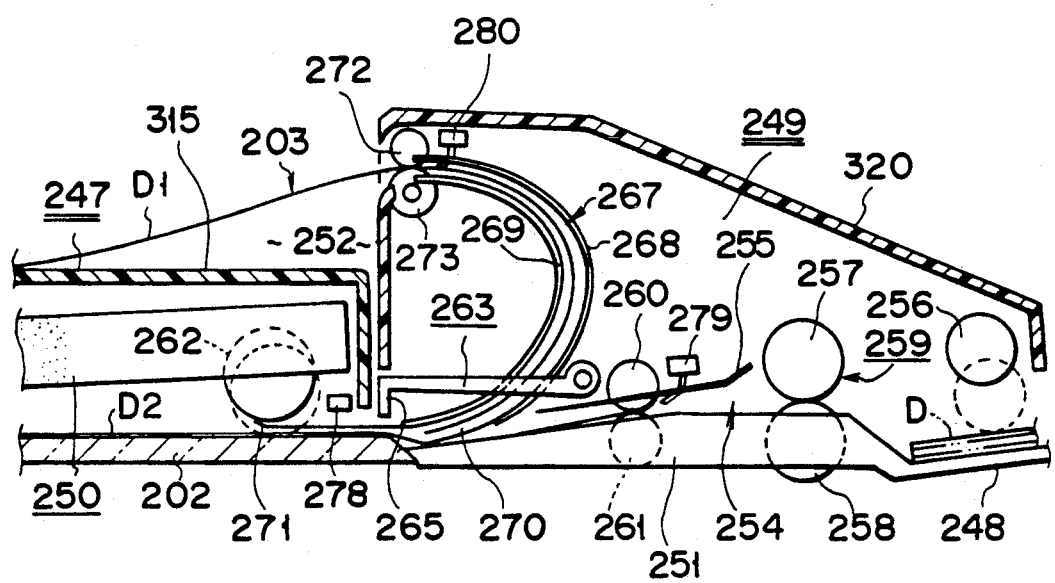
Figure 20J:
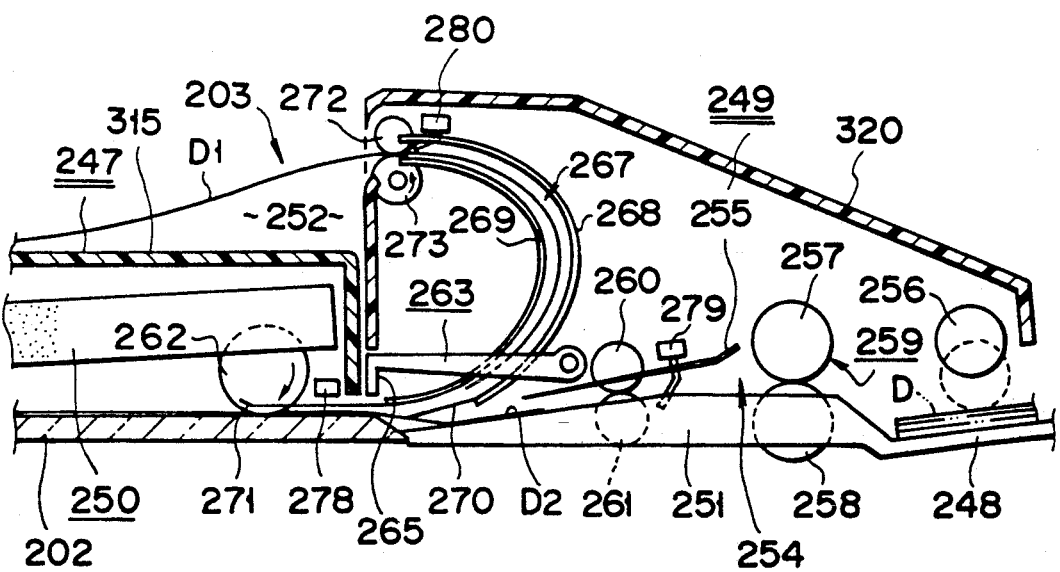

When the leading end of the original D1 is detected by the original sensing switch 280 at the exit of the second convey path 267 (step ST21 in FIG. 21b), it is checked by an original sensor (not shown) if originals remain on the original feed tray 248 (step ST22 in FIG. 21b). If it is determined that no original remains, the apparatus is set in the standby state (step ST1 in FIG. 21a). If it is determined that originals remain on the original feed tray 248, the pickup roller 256 and the feed roller 257 and the separation roller 258 of the separation/convey means 259 are driven to pick up the next original D2 from the original feed tray 248 (step ST23 in FIG. 21b). As shown in FIG. 20g, when the leading end of the original D2 is detected by the original sensing switch 279 in the first convey path 254 (step ST24 in FIG. 21b), the solenoid 292 for the feed/eject rollers 262 is turned on, and the feed/eject rollers 262 are separated from the platen glass 202, as shown in FIG. 20h (step ST25 in FIG. 20h). The registration rollers 260 and 261 are driven to further convey the original D2 toward the platen glass 202 (step ST26 in FIG. 21b). When the trailing end of the original D2 is detected by the original sensing switch 279, as shown in FIG. 20i (step ST9 in FIG. 21a), the feed/eject rollers 262 are moved downward and rotated, as shown in FIG. 20j, and the original D2 is fed onto the platen glass 202 (steps ST10 and ST11 in FIG. 21a). In this case, the convey timings of the originals D1 and D2 are defined so that the trailing end of the immediately preceding original D1 has already passed under the feed/eject rollers 262 at this time.

Thereafter, the setting operation of the original D2 to the predetermined position of the right half portion on the platen glass 202, the copying operation, and the eject operation from the predetermined position on the platen glass 202 are performed in the same manner as described above. The series of operations are repeated until all the originals placed on the original feed tray 248 are fed.

When the copying operations of all the originals D on the original feed tray 248 are performed and originals are ejected onto the original eject tray 252, the apparatus main body 200 is set in a normal standby state, as shown in FIG. 20a.

What is claimed is:

1. An image forming apparatus comprising:
   an original table on which an original is set at one end portion or the other end portion of a surface thereof;
   scanning means, moved between said one end portion and said other end portion along said original table, for projecting light toward the original on said original table to be inclined from a direction perpendicular to said original table in a direction of said one end portion of said original table to scan the original on said original table; and
   stopper means for setting the original at a position located away from the end edge of said other end portion of said original table in the direction of the end edge of said one end portion thereof by a predetermined distance at said other end portion of said original table, so that the original is set at said other end portion of the original table to fall outside a region of said other end portion where light from the scanning means is attenuated; wherein
   said stopper means comprises a stopper member including a pair of arms projecting from said other end edge toward said one end edge of said original table along two side edges connecting said one end edge and said other end edge, and a beam portion coupling projecting ends of said pair of arms and extending along said other end edge, and
   said stopper member being pivotal about proximal end portions of said pair of arms as fulcrums so that said beam portion is brought into contact with or separated from the position on the surface of said original table located away from said other end edge by the predetermined distance, and said beam portion of said stopper member which is brought into contact with the position on the surface of said original table located away from said other end edge by the predetermined distance constitutes a set reference of the original at said other end portion of said original table.

2. An apparatus according to claim 1, wherein the original is fed to and ejected from said other end portion of said original table through a gap between said beam portion of said stopper member and the surface of said original table while said stopper member causes said beam portion to be separated from the surface of said original table.

3. An apparatus according to claim 1, wherein the original is moved from said other end portion of said original table in a direction toward said one end portion to be fed from the outside of said original table to said other end portion, and is moved from said one end portion in a direction toward said other end portion to be ejected from said other end portion of said original table to the outside of said original table.

4. An apparatus according to claim 1, wherein the end surface of said other end edge of said original table is inclined along a projection direction of light projected from said scanning means.

5. The image forming apparatus according to claim 1, further including an automatic document feeder for sequentially feeding a plurality of originals to said other end portion on said original table and sequentially ejecting the originals from said other portion on said original table;
said automatic document feeder comprising:
original feed means for sequentially feeding the plurality of originals onto said original table;
original eject means for ejecting the original set on said original table in a direction opposite to an original feed direction onto said original table by said original feed means;
external guide means for guiding the original ejected from the original table by said original eject means to the outside of said automatic document feeder; and
an elastic sheet member fixed at an entrance of said external guide means and projecting into an original moving path between said original feed means and said original eject means, for allowing movement of said original toward said original table while being elastically pushed aside by said original fed onto said original table by said original feeding means, and for guiding the original ejected from said original table by said original eject means to said external guide means while resisting said original ejected from said original table not to be pushed aside by said ejected original.

6. An image forming apparatus comprising:
an original table on which an original is set at one end portion or the other end portion thereof;
scanning means, moved between said one end portion and said other end portion along said original table, for projecting light to the original to scan the original on said original table; and
stopper means for setting the original at a position located away from the end edge of said other end portion of said original table in the direction of the end edge of said one end portion thereof by a predetermined distance at said other end portion of said original table, so that the original is set at said other end portion of the original table to fall outside a region of said other end portion where light from the scanning means is attenuated; wherein said stopper means comprises a stopper member including a pair of arms projecting from said other end edge toward said one end edge of said original table along two side edges connecting said one end edge and said other end edge, and a beam portion coupling projecting ends of said pair of arms and extending along said other end edge, and
said stopper member being pivotal about proximal end portions of said pair of arms as fulcrums so that said beam portion is brought into contact with or separated from the position on the surface of said original table located away from said other end edge by the predetermined distance, and said beam portion of said stopper member which is brought into contact with the position on the surface of said original table located away from said other end edge by the predetermined distance constitutes a set reference of the original at said other end portion of said original table.

7. An image forming apparatus for scanning an original set on an original table with light to form an image corresponding to an image on the original on a recording material, comprising:
an automatic document feeder for sequentially feeding a plurality of originals onto said original table and sequentially ejecting the originals from said original table,
wherein said automatic document feeder includes:
original feed means for sequentially feeding the plurality of originals onto said original table to set the original on said original table;
original set/eject means for setting the original fed onto said original table by said original feed means at a predetermined position on said original table, and for ejecting the original set at the predetermined position on said original table in a direction opposite to an original feed direction onto said original table by said original feed means;
original externally discharge means for discharging the original ejected from said original table by said original set/eject means to the outside of said automatic document feeder;
contact/separation switching means for causing said original set/eject means to be brought into contact with or separated from said original table; and
control means for, when discharging of the original to the outside of said automatic document feeder by said original externally discharge means is started, causing said contact/separation switching means to separate said original set/eject means from said original table and causing said original feed means to feed the next original through a portion under the original which is being ejected.

8. An apparatus according to claim 7, wherein said control means includes first original sensing means arranged in a first original convey path extending from said original feed means to said original table, and second original sensing means arranged in a second original convey path extending from said original set/eject means to said original externally discharge means,
when said first original sensing means senses a leading end of the original in said first original convey path, said control means causes said contact/separation switching means to separate said original set/eject means from said original table, thereby allowing said original feed means to feed the original onto said original table, when said first original sensing means senses a trailing end of the original in said first original convey path, said control means causes said contact/separation switching means to approach said original set/eject means toward said original table and causing said original set/eject means to set the original in said first original convey path at the predetermined position on said original table, when said second original sensing means senses the leading end of the original in said second original convey path, said control means causes said contact/separation switching means to separate said original set/eject means from said original table, thereby causing said original set/eject means to stop ejection of the original into said second original convey path and allowing said original feed means to feed a next original onto said original table, the next original to be fed onto said original table by said original feed means being fed onto said original table through a portion under the original ejected into said second original convey path by said original set/eject means, and the original in said second original convey path being discharged to the outside of said automatic document feeder by said original externally discharge means, and when said first original sensing means senses the trailing end of the next original in said first original convey path and said original set/eject means is caused to approach said original table after the leading end of the original in said second original convey path being sensed by said second original sensing means and said original set/eject means being separated from said original table, the trailing end of the preceding original in said second original convey path has already been passed away from said original set/eject means.

9. An image forming apparatus, which comprises: an original table on which an original is set at one end portion of the other end portion of a surface thereof; scanning means, moved between said one end portion of said other end portion along said original table, for projecting light toward the original on said original table to be inclined from a direction perpendicular to said original table in a direction of said one end portion of said original table to scan the original on said original table; and an automatic document feeder for sequentially feeding a plurality of originals onto said original table and sequentially ejecting the originals from said original table, and the apparatus scanning the original set on said original table with light to form an image corresponding to an image on the original on a recording material;

wherein said automatic document feeder comprises:

original feed means for sequentially feeding the plurality of originals onto said original table;

original set/eject means for setting the original fed onto said original table by said original feed means at a predetermined position on said original table, and for ejecting the original set at the predetermined position on said original table in a direction opposite to an original feed direction onto said original table by said original feed means;

original external discharge means for discharging the original ejected from said original table by said original set/eject means to the outside of said automatic document feeder;

contact/separation switching means for causing said original set/eject means to be brought into contact with or separated from said original table; and control means for, when discharging of the original to the outside of said automatic document feeder by said original externally discharge means is started, causing said contact/separation switching means to separate said original set/eject means from said original table and causing said original feed means to feed the next original through a portion under the original which is being ejected, said original set/eject means including stopper means for setting the original at a position located away from the end edge of said other end portion of said original table in the direction of the end edge of said one end portion thereof by a predetermined distance at said other end portion of said original table, so that the original is set at said other end portion of the original table to fall outside a region of said other end portion where light from the scanning means is attenuated.

10. An image forming apparatus for scanning an original set on an original table with light to form an image corresponding to an image on the original on a recording material, comprising:

an automatic document feeder for sequentially feeding a plurality of originals onto said original table and sequentially ejecting the originals from said original table, wherein said automatic document feeder includes:

original feed means for sequentially feeding the plurality of originals onto said original table;

original set/eject means for setting the original fed onto said original table by said original feed means at a predetermined position on said original table, and for ejecting the original set at the predetermined position on said original table in a direction opposite to an original feed direction onto said original table by said original feed means;

original externally discharge means for discharging the original ejected from said original table by said original set/eject means to the outside of said automatic document feeder;

contact/separation switching means for causing said original set/eject means to be brought into contact with or separated from said original table;

control means for, when discharging of the original to the outside of said automatic document feeder by said original externally discharge means is started, causing said contact/separation switching means to separate said original set/eject means from said original table and causing said original feed means to feed the next original through a portion under the original which is being ejected; and an elastic sheet member, fixed at an entrance of said externally discharge means and projecting into an original moving path between said original feed means and said original eject means, for allowing movement of the original from said original feed means onto said original table while being elastically pushed aside by said original fed onto said original table by said original feed means, and for guiding the original ejected from said original table by said original eject means to said external guide means while resisting said original ejected from said original table not to be pushed aside by said ejected original.

11. An image forming apparatus, which comprises: an original table on which an original is set at one end portion or the other end portion of a surface thereof; scanning means, moved between said one end portion and said other end portion along said original table, for projecting light toward the original on said original table to be inclined from a direction perpendicular to said original table in a direction of said one end portion of said original table to scan the original on said original table; and an automatic document feeder for sequentially feeding a plurality of originals onto said original table and sequentially ejecting the originals from said original table, and the image forming apparatus scanning the original set on said original table with light to form an image corresponding to an image on the original on a recording material:

wherein said automatic document feeder comprises:

original feed means for sequentially feeding the plurality of originals onto said original table;

original set/eject means for setting the original fed onto said original table by said original feed means at a predetermined position on said original table, and for ejecting the original set at the predetermined position on said original table in a direction opposite to an original feed direction onto said original table by said original feed means;

original externally discharge means for discharging the original ejected from said original table by said original set/eject means to the outside of said automatic document feeder;

contact/separation switching means for causing said original set/eject means to be brought into contact with or separated from said original table;

control means for, when discharging of the original to the outside of said automatic document feeder by said original externally discharge means is started, causing said contact/separation switching means to separate said original set/eject means from said original table and causing said original feed means to feed the next original through a portion under the original which is being ejected; and an elastic sheet member, fixed at an entrance of said externally discharge means and projecting into an original moving path between said original feed means and said original eject means, for allowing movement of the original from said original feed means onto said original table while being elastically pushed aside by said original fed onto said original table by said original feed means, and for guiding the original ejected from said original table by said original eject means to said external guide means while resisting said original ejected from said original table not to be pushed aside by said ejected original, said original set/eject means including stopper means for setting the original at a position located away from the end edge of said other end portion of said original table in the direction of the end edge of said one end portion thereof by a predetermined distance at said other end portion of said original table, so that the original is set at said other end portion of the original table to fall outside a region of said other end portion where light from the scanning means is attenuated.

* * * * *